(12) United States Patent
Nguyen et al.

(10) Patent No.: US 7,692,667 B2
(45) Date of Patent: Apr. 6, 2010

(54) HANDHELD COMPUTER HAVING MOVEABLE SEGMENTS THAT ARE INTERACTIVE WITH AN INTEGRATED DISPLAY

(75) Inventors: Huy P. Nguyen, San Jose, CA (US); Lawrence Lam, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 337 days.

(21) Appl. No.: 10/006,538

(22) Filed: Nov. 30, 2001

(65) Prior Publication Data

US 2003/0038786 A1     Feb. 27, 2003

Related U.S. Application Data

(63) Continuation-in-part of application No. 09/932,213, filed on Aug. 17, 2001.

(51) Int. Cl.
  *G09G 5/22*    (2006.01)
(52) U.S. Cl. .................. 345/619; 345/698; 345/660; 345/162; 345/169
(58) Field of Classification Search ............ 345/169, 345/184, 158, 156, 901, 967, 961, 905, 903, 345/619, 660, 698, 162; 455/91, 95, 575.4, 455/556.1, 556.2
See application file for complete search history.

(56) References Cited

U.S. PATENT DOCUMENTS

| | | | | |
|---|---|---|---|---|
| 3,914,021 | A | * | 10/1975 | Nishimura .................... 349/58 |
| 4,279,021 | A |   | 7/1981  | See et al. |
| 4,415,065 | A |   | 11/1983 | Sandstedt |
| 4,432,733 | A | * | 2/1984  | Carlson .................... 434/339 |
| 4,587,630 | A |   | 5/1986  | Straton et al. |
| 4,725,694 | A |   | 2/1988  | Auer et al. |
| 4,764,770 | A |   | 8/1988  | Church |
| 4,887,212 | A |   | 12/1989 | Zamora et al. |
| 4,892,981 | A |   | 1/1990  | Soloway et al. |
| 4,916,441 | A |   | 4/1990  | Gombrich |
| 5,010,547 | A |   | 4/1991  | Johnson et al. |
| 5,012,219 | A |   | 4/1991  | Henry |

(Continued)

FOREIGN PATENT DOCUMENTS

EP            0149762          7/1985

(Continued)

OTHER PUBLICATIONS

Sensing techniques for mobile interaction, Ken Hinckley, Jeff Pierce, Mike Sinclair, Eric Horvitz Nov. 2000 Proceedings of the 13th annual ACM symposium on User interface software and technology UIST '00.*

(Continued)

*Primary Examiner*—Javid A Amini

(57) ABSTRACT

A handheld computer is provided that includes a first module and at least a second module. The first module includes a processor and a display. The second module is slideably coupled to the first module so that it functions as a sliding cover that may effectively change the visible area of the underlying display. The handheld computer includes a sensing device coupled to the processor. The sensing device provides information to the processor regarding the relative position of the first module with respect to the second module. The information provided may be used to reconfigure the visual output of the display or to select a macro command presented on the display.

26 Claims, 14 Drawing Sheets

U.S. PATENT DOCUMENTS

| | | | |
|---|---|---|---|
| D320,598 S | 10/1991 | Auerbach et al. | |
| 5,067,164 A | 11/1991 | Denker et al. | |
| 5,075,684 A | 12/1991 | DeLuca | |
| 5,101,439 A | 3/1992 | Kiang | |
| 5,109,539 A | 4/1992 | Inubushi et al. | 455/575 |
| D326,451 S | 5/1992 | Roegner | D14/138 |
| 5,218,188 A | 6/1993 | Hanson | |
| 5,227,614 A | 7/1993 | Danielson et al. | |
| 5,235,561 A | 8/1993 | Seager | 368/10 |
| 5,307,086 A | 4/1994 | Griffin et al. | |
| 5,334,824 A | 8/1994 | Martinez | |
| 5,335,276 A | 8/1994 | Thompson et al. | |
| 5,336,001 A | 8/1994 | Lichtenberg | |
| 5,345,615 A | 9/1994 | Garofalo | |
| 5,357,065 A | 10/1994 | Mitamura et al. | |
| 5,359,317 A | 10/1994 | Gomez et al. | |
| 5,379,057 A | 1/1995 | Clough et al. | |
| 5,381,387 A | 1/1995 | Blonder et al. | 368/10 |
| 5,392,447 A | 2/1995 | Schlack et al. | |
| 5,394,140 A | 2/1995 | Wong et al. | |
| D359,920 S | 7/1995 | Sakamoto | |
| 5,440,629 A | 8/1995 | Gray | 379/433.12 |
| 5,442,406 A * | 8/1995 | Altmanshofer et al. | 348/588 |
| 5,450,619 A | 9/1995 | Maeda | |
| 5,465,401 A | 11/1995 | Thompson | |
| 5,494,363 A | 2/1996 | Hochgesang | |
| 5,503,484 A | 4/1996 | Louis | |
| 5,510,808 A | 4/1996 | Cina, Jr. | |
| D370,673 S * | 6/1996 | Happo et al. | D14/138 |
| 5,584,054 A | 12/1996 | Tyneski et al. | |
| 5,612,682 A | 3/1997 | DeLuca et al. | |
| 5,619,555 A | 4/1997 | Fenton et al. | |
| 5,627,978 A | 5/1997 | Altom et al. | |
| 5,646,402 A | 7/1997 | Khovaylo et al. | |
| 5,650,776 A | 7/1997 | Mitchell et al. | |
| 5,661,641 A | 8/1997 | Shindo | |
| 5,705,995 A | 1/1998 | Laflin et al. | |
| 5,719,936 A | 2/1998 | Hillenmayer | 379/447 |
| 5,742,894 A * | 4/1998 | Jambhekar et al. | 455/575.3 |
| 5,745,904 A | 4/1998 | King et al. | |
| 5,754,636 A | 5/1998 | Bayless et al. | |
| 5,779,030 A | 7/1998 | Ikegami et al. | |
| 5,797,089 A | 8/1998 | Nguyen | |
| 5,797,098 A | 8/1998 | Schroeder et al. | |
| 5,809,115 A | 9/1998 | Inkinen | |
| 5,812,651 A | 9/1998 | Kaplan | |
| 5,813,778 A | 9/1998 | Shi | |
| 5,815,142 A | 9/1998 | Ailard et al. | |
| 5,821,881 A | 10/1998 | Fischer et al. | |
| D401,577 S | 11/1998 | Yamaguchi | |
| 5,848,356 A | 12/1998 | Jambhekar et al. | |
| 5,860,074 A | 1/1999 | Rowe et al. | |
| 5,873,108 A | 2/1999 | Goyal et al. | |
| 5,889,600 A | 3/1999 | McGuire | |
| 5,903,852 A | 5/1999 | Schaupp, Jr. et al. | |
| 5,917,905 A | 6/1999 | Whipple et al. | |
| 5,917,906 A | 6/1999 | Thornton | |
| 5,920,310 A * | 7/1999 | Faggin et al. | 345/173 |
| 5,922,071 A | 7/1999 | Taylor et al. | |
| 5,941,648 A | 8/1999 | Robinson et al. | |
| 5,949,408 A * | 9/1999 | Kang et al. | 345/169 |
| 5,949,764 A | 9/1999 | Yoshida et al. | |
| 5,956,625 A * | 9/1999 | Hansen et al. | 455/575.4 |
| 5,958,006 A | 9/1999 | Eggleston et al. | |
| 5,974,334 A | 10/1999 | Jones, Jr. | |
| D416,256 S | 11/1999 | Griffin et al. | |
| 5,996,080 A * | 11/1999 | Silva et al. | 713/320 |
| 6,002,944 A | 12/1999 | Beyda | |
| 6,003,052 A * | 12/1999 | Yamagata | 708/100 |
| 6,005,767 A * | 12/1999 | Ku et al. | 361/679.27 |
| 6,006,109 A | 12/1999 | Shin | |
| 6,009,338 A * | 12/1999 | Iwata et al. | 455/575.4 |
| 6,016,142 A | 1/2000 | Chang et al. | |
| 6,018,571 A | 1/2000 | Langlois et al. | |
| 6,029,072 A | 2/2000 | Barber | |
| 6,034,335 A * | 3/2000 | Aufderheide et al. | 200/5 A |
| 6,035,214 A | 3/2000 | Henderson | |
| D423,000 S * | 4/2000 | Prietsman et al. | D14/138 |
| 6,055,439 A | 4/2000 | Helin et al. | |
| 6,058,304 A | 5/2000 | Callaghan et al. | |
| 6,061,068 A * | 5/2000 | Hoffman et al. | 345/619 |
| 6,064,734 A | 5/2000 | Hasegawa et al. | 379/433.07 |
| 6,069,593 A * | 5/2000 | Lebby et al. | 345/1.1 |
| 6,069,648 A | 5/2000 | Suso et al. | |
| 6,084,951 A | 7/2000 | Smith et al. | |
| 6,097,391 A | 8/2000 | Wilcox | |
| 6,101,531 A | 8/2000 | Egglestori et al. | |
| 6,115,248 A | 9/2000 | Canova et al. | |
| 6,119,179 A | 9/2000 | Whitridge et al. | |
| 6,128,475 A * | 10/2000 | Wicks et al. | 455/575.4 |
| 6,133,916 A | 10/2000 | Bukszaar et al. | |
| 6,137,469 A * | 10/2000 | Wu et al. | 345/660 |
| 6,157,630 A | 12/2000 | Adler et al. | |
| 6,166,342 A | 12/2000 | Chou | |
| 6,169,911 B1 | 1/2001 | Wagner et al. | |
| 6,188,917 B1 | 2/2001 | Laureanti | |
| 6,191,838 B1 * | 2/2001 | Muramatsu | 349/149 |
| 6,192,118 B1 | 2/2001 | Bayless et al. | |
| 6,198,053 B1 | 3/2001 | Chou | |
| 6,208,879 B1 * | 3/2001 | Iwata et al. | 455/566 |
| 6,215,865 B1 | 4/2001 | McCalmont | |
| 6,229,695 B1 * | 5/2001 | Moon | 361/683 |
| 6,233,469 B1 | 5/2001 | Watanabe | 455/575.1 |
| 6,243,452 B1 | 6/2001 | O'Shaughnessey et al. | |
| 6,243,595 B1 * | 6/2001 | Lee et al. | 455/566 |
| 6,249,672 B1 * | 6/2001 | Castiel | 455/575.4 |
| D445,409 S * | 7/2001 | Segers | D14/138 |
| 6,256,631 B1 | 7/2001 | Malcolm | |
| 6,259,449 B1 | 7/2001 | Saxena et al. | |
| 6,259,932 B1 | 7/2001 | Constein | |
| 6,262,716 B1 | 7/2001 | Raasch | 345/168 |
| 6,266,236 B1 * | 7/2001 | Ku et al. | 361/679.27 |
| 6,278,884 B1 | 8/2001 | Kim | |
| 6,295,372 B1 | 9/2001 | Hawkins et al. | |
| 6,297,795 B1 | 10/2001 | Kato et al. | |
| 6,297,945 B1 * | 10/2001 | Yamamoto | 361/681 |
| 6,304,763 B1 * | 10/2001 | Jahagirdar et al. | 455/566 |
| 6,310,609 B1 | 10/2001 | Morgenthaler | |
| 6,317,313 B1 | 11/2001 | Mosgrove et al. | 361/680 |
| 6,317,781 B1 | 11/2001 | De Boor et al. | |
| 6,333,973 B1 | 12/2001 | Smith et al. | |
| 6,342,738 B1 * | 1/2002 | Lutnaes | 307/125 |
| D454,349 S | 3/2002 | Makidera et al. | |
| 6,362,440 B1 * | 3/2002 | Karidis et al. | 178/18.01 |
| 6,370,018 B1 | 4/2002 | Miller, Jr. et al. | |
| D456,794 S | 5/2002 | Laverick et al. | |
| 6,389,124 B1 | 5/2002 | Schnarel et al. | |
| 6,397,084 B1 * | 5/2002 | Wicks et al. | 455/566 |
| 6,405,172 B1 | 6/2002 | Baker et al. | |
| 6,415,138 B2 | 7/2002 | Sirola et al. | |
| 6,424,369 B1 | 7/2002 | Adair et al. | |
| 6,442,263 B1 * | 8/2002 | Beaton et al. | 379/142.04 |
| D462,354 S | 9/2002 | Kimbre et al. | |
| 6,445,577 B1 | 9/2002 | Madsen et al. | |
| 6,452,588 B2 | 9/2002 | Griffin et al. | |
| D464,962 S | 10/2002 | MacGregor et al. | |
| 6,462,941 B1 | 10/2002 | Hulick et al. | |
| 6,466,202 B1 | 10/2002 | Suso et al. | |
| 6,469,910 B2 | 10/2002 | Lefort | |
| 6,483,445 B1 | 11/2002 | England | 341/22 |
| 6,483,697 B1 | 11/2002 | Jenks et al. | |
| 6,502,090 B1 | 12/2002 | Raisanen | |
| D468,714 S | 1/2003 | Maruska et al. | |
| 6,512,507 B1 * | 1/2003 | Furihata et al. | 345/157 |

| | | | |
|---|---|---|---|
| D470,842 S | 2/2003 | Bhatia et al. | |
| 6,516,202 B1 | 2/2003 | Hawkins et al. | |
| 6,525,715 B2 | 2/2003 | Uchiyama | |
| D471,159 S | 3/2003 | Albicker | |
| D471,559 S | 3/2003 | De Saulles | |
| 6,535,749 B1* | 3/2003 | Iwata et al. | 455/556.2 |
| D473,580 S | 4/2003 | Nakahara | |
| 6,542,721 B2* | 4/2003 | Boesen | 455/553.1 |
| 6,549,194 B1 | 4/2003 | McIntyre et al. | 345/173 |
| 6,557,004 B1 | 4/2003 | Ben-Shathar et al. | |
| 6,577,721 B1 | 6/2003 | Vainio et al. | |
| 6,583,806 B2 | 6/2003 | Ludwig et al. | |
| D477,597 S | 7/2003 | Laverick et al. | |
| 6,587,700 B1 | 7/2003 | Meins et al. | |
| 6,593,914 B1* | 7/2003 | Nuovo et al. | 345/169 |
| 6,636,203 B1* | 10/2003 | Wong et al. | 345/173 |
| 6,636,419 B2 | 10/2003 | Duarte | |
| 6,643,124 B1 | 11/2003 | Wilk | 361/681 |
| 6,643,529 B1 | 11/2003 | Inoue et al. | |
| 6,658,272 B1 | 12/2003 | Lenchik et al. | |
| 6,661,404 B1 | 12/2003 | Sirola et al. | |
| 6,667,738 B2* | 12/2003 | Murphy | 345/173 |
| 6,710,771 B1* | 3/2004 | Yamaguchi et al. | 345/184 |
| D488,478 S | 4/2004 | Laverick et al. | |
| 6,724,403 B1 | 4/2004 | Santoro et al. | |
| 6,748,249 B1* | 6/2004 | Eromaki et al. | 455/575.4 |
| 6,781,575 B1 | 8/2004 | Hawkins et al. | |
| 6,792,090 B1 | 9/2004 | Kobayashi | |
| 6,819,304 B2 | 11/2004 | Branson | |
| 6,947,158 B1 | 9/2005 | Kitamura et al. | |
| 6,961,593 B1* | 11/2005 | Lonka et al. | 455/573 |
| 6,965,375 B1* | 11/2005 | Gettemy et al. | 345/173 |
| 6,968,161 B2* | 11/2005 | Inomata et al. | 455/90.3 |
| 6,973,217 B2 | 12/2005 | Bolick et al. | |
| 6,976,217 B1 | 12/2005 | Vertaschitsch | |
| 7,007,239 B1 | 2/2006 | Hawkins et al. | |
| 7,058,168 B1 | 6/2006 | Knappe et al. | |
| 7,069,056 B2* | 6/2006 | Iwata et al. | 455/566 |
| 7,142,195 B2* | 11/2006 | Northway et al. | 345/169 |
| 7,155,419 B2 | 12/2006 | Blackman et al. | |
| 7,170,468 B2* | 1/2007 | Knopf | 345/1.3 |
| 7,231,208 B2 | 6/2007 | Robertson et al. | |
| 7,295,852 B1 | 11/2007 | Davis et al. | |
| 2001/0034222 A1 | 10/2001 | Roustaei et al. | |
| 2001/0046886 A1 | 11/2001 | Ishigaki | |
| 2002/0044136 A1 | 4/2002 | Griffin et al. | |
| 2002/0044216 A1 | 4/2002 | Cha | |
| 2002/0082043 A1 | 6/2002 | Wilska et al. | |
| 2002/0089546 A1 | 7/2002 | Kanevsky et al. | |
| 2002/0115478 A1 | 8/2002 | Fujisawa et al. | |
| 2002/0133074 A1 | 9/2002 | Mault et al. | |
| 2002/0140667 A1 | 10/2002 | Horiki | |
| 2002/0154745 A1 | 10/2002 | Shtivelman | |
| 2002/0169924 A1* | 11/2002 | Osborn | 711/106 |
| 2002/0191160 A1* | 12/2002 | Chuang | 353/85 |
| 2003/0008679 A1* | 1/2003 | Iwata et al. | 455/556 |
| 2003/0034987 A1 | 2/2003 | Webb et al. | 345/629 |
| 2003/0064751 A1 | 4/2003 | Charlier et al. | |
| 2003/0071791 A1 | 4/2003 | Hanson | |
| 2003/0090465 A1 | 5/2003 | Dellinger | |
| 2003/0112225 A1* | 6/2003 | Granberg | 345/173 |
| 2003/0122779 A1 | 7/2003 | Martin et al. | |
| 2003/0211872 A1* | 11/2003 | Meins et al. | 455/575.1 |
| 2003/0228863 A1 | 12/2003 | Vander Veen et al. | |
| 2003/0228888 A1 | 12/2003 | Adamson | |
| 2004/0008827 A1 | 1/2004 | Martin et al. | |
| 2004/0023643 A1 | 2/2004 | Vander Veen et al. | |
| 2004/0026136 A1 | 2/2004 | Hill et al. | |
| 2004/0028192 A1 | 2/2004 | Pelletier | |
| 2004/0028199 A1 | 2/2004 | Carlson | |
| 2004/0039794 A1 | 2/2004 | Biby et al. | |
| 2004/0061706 A1 | 4/2004 | Cronin et al. | |
| 2004/0062367 A1 | 4/2004 | Fellenstein et al. | |
| 2004/0155909 A1 | 8/2004 | Wagner | |
| 2004/0203977 A1 | 10/2004 | Kennedy | |
| 2004/0240163 A1 | 12/2004 | Adams et al. | |
| 2004/0248621 A1* | 12/2004 | Schon | 455/566 |
| 2004/0268263 A1 | 12/2004 | Van Dok et al. | |
| 2005/0267975 A1 | 12/2005 | Qureshi et al. | |
| 2006/0015819 A1 | 1/2006 | Hawkins et al. | |
| 2006/0033706 A1 | 2/2006 | Haitani et al. | |
| 2006/0121938 A1 | 6/2006 | Hawkins et al. | |
| 2006/0160566 A1 | 7/2006 | Plahte et al. | |
| 2006/0161858 A1 | 7/2006 | Hawkins et al. | |
| 2006/0168539 A1 | 7/2006 | Hawkins et al. | |
| 2007/0209019 A1 | 9/2007 | Kaval et al. | |

FOREIGN PATENT DOCUMENTS

| | | |
|---|---|---|
| EP | 0 159 539 | 10/1985 |
| EP | 0 385 290 | 9/1990 |
| EP | 0704788 | 4/1996 |
| EP | 0 818 763 | 1/1998 |
| EP | 1051012 A2 * | 11/2000 |
| EP | 1107101 A2 * | 6/2001 |
| FR | 2760933 | 9/1998 |
| WO | 94 17498 | 8/1994 |
| WO | 95 22810 | 8/1995 |
| WO | 95 35546 | 12/1995 |
| WO | 99 08238 | 2/1999 |
| WO | 01 13605 | 2/2001 |
| WO | 03 017245 | 2/2003 |

OTHER PUBLICATIONS

Non-Contact Sensor For Servo Track Writer—Company Business and Marketing. Larry Sato, Year 2000, see detecting pronciple on first page, (2 pages).*
"Excerpts from Handspring VisorPhone (TM) User's Guide, Copyright 2000 Handspring, Inc."
Printout of various website pates frombiz.yahoo.com article: "Conference Calling Added to BestNet's Service Designed for Palm OS(R) Handhelds:—Tuesday, Aug. 21, 2001".
Argrawal, P. et al., "Get Wireless: A Mobile Technology Spectrum", IT PRO, IEEE, (Jul./Aug. 1999), 18-23.
"Communications Solutions (TM) TMC Labs Test Drive, Mar. 2000", Retrieved from the internet: URL: https://www.tmcnet.com/articles/comsol/0300/0300labs1.htm.
Cullen, A. "connecting with Your EO Cellular Module", EO, Inc. Mountain View, (1992, 1993), ii-33.
Cullen, A. "Getting Started with your EO Personal Communicator", EO, Inc., Mountain View, (1992, 1993), ii-74.
Cullen, A. "Lookup Guide to the EO Personal Communicator", EO, Inc., Mountain View, (1992,1993), ii-320.
"IBM TouchMobile Information and Planning Guide", International Business Machines Incorporated, Mar. 1993, 20 pages.
Maki, K. "The AT & T EO Travel Guide", John Wiley & Sons, Inc., N.Y, 1993, iii-555.
Kanellos, M. "Qualcomm Merges Phone, Handheld", CNET News.om, Sep. 21, 1998, http://www.news.com/Qualcomm+merges+phone%2C+handheld/2100-1001_3-215791.html.
"PCT International Search Report", PCT/US2000/22182, (Jan. 10, 2001), 8 pages.
"PCT Notification of Transmittal of International Preliminary Examination Report", PCT/US2000/22182, (Oct. 26, 2001), 6 pages.
"pdQ (TM) Basics Handbook", Qualcomm Incorporated, (1998,1999) 96 pages.
"Qualcomm pdQ (TM) 1900 Digital PCTS SmartPhone", Qualcomm Incorporated, (1999), 2 pages.
Shah, R. "The Qualcomm pdQ: Kill Two Birds with One Phone", Cnn.com, http://archives.cnn.com/i999rrECHJptechJi2/o3/qualcomm.pdq, (Dec. 3, 1999).
"The Handheld Computing Industry-2000", Stanford Technology Ventures Program (STVP), (Jan. 13, 2001), pp. 1-38.
"Toshiba Computer Systems Group: Pocket PC e570", http:www.pda.toshiba.com, (Jul. 7, 2001), 2 pages.

"Excerpts from Ericsson Mobile Phone 1888 WORLD User's Guide", Copyright 1998 Ericsson Mobile Communications AB.

Printout of various web site pages from www.bestnetcall.com regarding pdaCall (patent pending), printed Aug. 31, 2001.

"3GPP2 Multimedia Messaging System-MMS Specification Overview-Revision: A. Mobile Messaging, May 2003, [online] [Retrieved on Dec. 10, 2004] Retrieved from the Internet: URL: http://www.lebodic.net/left.html".

"American Programmer, American Programmer, Inc. NY", (Dec. 1991) 4-33.

"An Introduction to Mobile Messaging", Mobile Messaging, May 2003, [online] [Retrieved on Dec. 10, 2004] Retrieved from the Internet: URL: http://www.lebodiclnetlintro.html.

"At Last, Technology Harnesse [sic] One of Most Powerf [sic] Forces Man to Men." GO Corporation, 14 pages, Foster City, (1991).

"AT&T New Release, NCR Cuts Price of 3170 Notebook Computer 11 to 19 Percent", 2 pages [online], retrieved from the Internet: URL http//www.att.con/press/0393/930308.nca.html., (Mar. 8, 1993.).

"Communications Solutions™ TMC Labs Test Drive, Mar. 2000", Retrieved from the Internet: URL: https://www.tmcnet.com/articles/comsol/0300/0300labs1.htm.

"Definition of Handheld Computer, printed from the website: http://dictionary.reference.com, dated Feb. 11, 2004 (3 pgs)."

"Definition of Handheld, printed from the website: http://searchmobilecomputing.techtarget.com, dated Feb. 11, 2004 (3 pgs)".

Stock, R. "The World of Messaging An Introduction to Personal Communicators", EO, Inc. Mountain View, (1992, 1993) pp. ii-69.

"Exceprts from Motorola Timeport Tri-Band Mobile Telephone Manual, Copyright 1999 Motorola, Inc."

"Excerpts From Ericsson Mobile Phone 1888 World User'S Guide, Copyright 1998 Ericsson Mobile Communications AB".

"GO Corporation Information Statement, 218 pages", (Nov. 8, 1993).

"Handheld Game Console-Wikipedia, the free encyclopedia, [online] [Retrieved on Oct. 13, 2006], Retrieved from the Internet: URL: http://en.wikipedia.org/wjkwHandheld_game_console."

Hewlett Packard, Products and Services, http://www.hp.com/, Nov. 11, 2001.

"IBM Selects Racotek Data/Voice Communications Services to Interface with Touchmobile Product, PR Newswire, Jan. 26, 1993, 2 pages."

"IBM TouchMobile Solution for Data Capture and Communication, Keeping Your Business Moving in the 90's, International Business Machines Incorporated, Jan. 1993, 13 pages."

"Introduction to PCMIA Technical Tutorial, December 6, 2002. pp. 1-11".

"Microsoft", Microsoft Windows & MS-DOS User's Guide, (1993), p. 19, 26.

"Nokia Introduces Mobile Chat With Nokia 3310", http://www.mobiletechnews.com/info/2000/09/01/1 42022.htm, (Sep. 1, 2000).

"Nokia, Frequently Asked Questions", http://www.nokia.co.in/nokiapac/india/faqs list/.

"PCT International Search Report", PublicationWO 01/13605 A3, (Feb. 22, 2001).

"T-Mobile Products; Handhelds", http://www.tmobile.com, (Sep. 28, 2002) 2 pages.

"T-Mobile Products; Sidekick", http://www.tmobile.com, Sep. 28, 2002, 3 pages.

"Toshiba Computer Systems Group" http://www.toshiba.com, (May 28, 2002) 1 page.

"Toshiba Computer Systems Group: Pocket PC e570", http://www.pda.toshiba.com, (Jul. 7, 2001) 2 pages.

Caar, R. M. "The Point of the Pen", Byte, Reprinted, Feb. 1991, 10 pages.

Chan, E. et al. "Personal Digital Assistants & Wireless Convergence", MGMT 557 Strategic Management of Innovation, (May 4, 2000) 1-28.

Cowart, R., Mastering Windows 95- The Windows 95 Bible, (1995), 110-117, 352-359.

Dyszel, B., "Handspring Visor for Dummies", IDG Books Worldwide, Inc, (2000), p. 13, 15, 121, 122, 123, 208.

Hinckley, Ken; et al; "Sensing Techniques for Mobile Interaction", CHI Letters, vol. 2, 2(2000) 91-100.

IBM's Touchmobile helps field workers collect data at the touch of a finger pr newswipe, Jan. 26, 1993 p. 1., publisher Pr Newswire Association Inc.

Ikeya, B. "Detailed Overview of the PC Card Standard, PCMCIA", http://www.pcmcia.org/pccarcjstandard.htm., (1998).

Kanellos, M. "Qualcomm Merges Phone, Handheld", CNET News.com, Sep. 21, 1998. http://www.news.com/Qualcomm+merges+phone%2C+handheld/2100-1001 3-215791.html.

MacNeill, D. "Messaging Card and NewtonMail: We Pick Up and Deliver", On The Go Magazine, http:www. pencomputing.com/Newton/NewtonNotes2.html. 2pages.

MacNeill, D. "Wireless Newton Technology Goes to Work", On the Go Magazine, Oct. 13, 1993. 2 pages. http://www.pencomputing.com/Newton/NewtonNotes2.html.

Maki, Ken. The At&T EO Travel Guide 1995. John Wiley & Sons, Inc. Copyright 1993.

Plumley, B., "Ten Minute Guide to Windows NT Workstation 4.0", Que, (Aug. 1996).

Powell, E. "Kyocera pdQ Smartphone- Brief Article- Product Announcement," http://www.findarticles.com/plartjdes/mjmOFAUTis917/ai65650619/print. (2000).

Sato, Larry "Non-Contact Sensor For Servo Track Writer", Company Business and Marketing, (Apr. 2000), 2.

Schlender, B.R. "Hot New PCs That Read Your Writing", Fortune Reprinted, (Feb. 11, 1991), 6 pages.

* cited by examiner

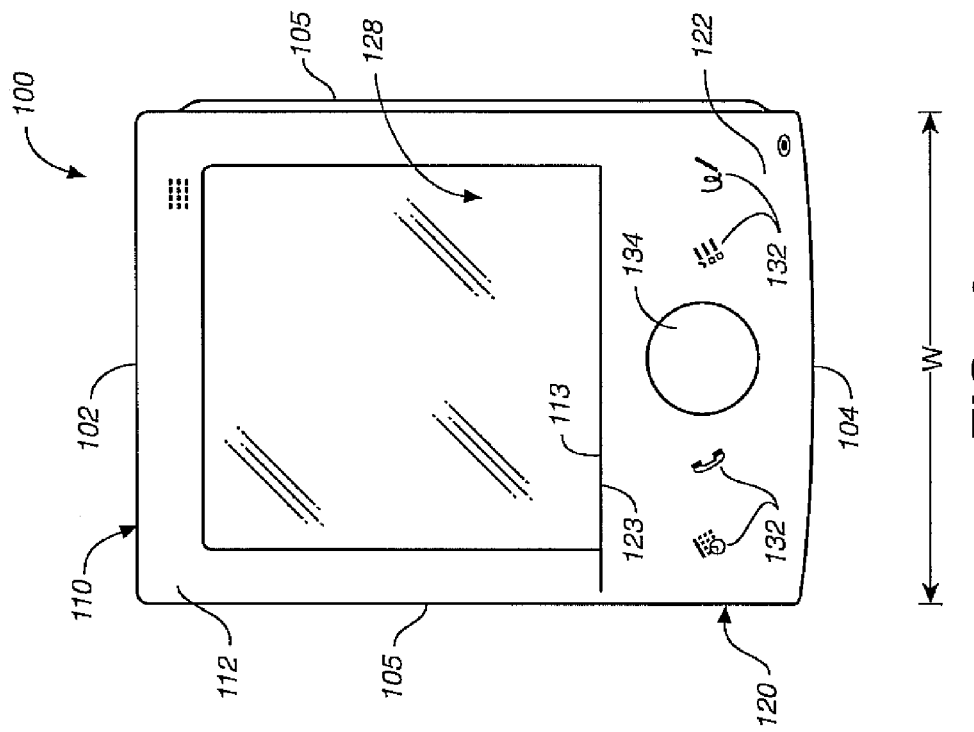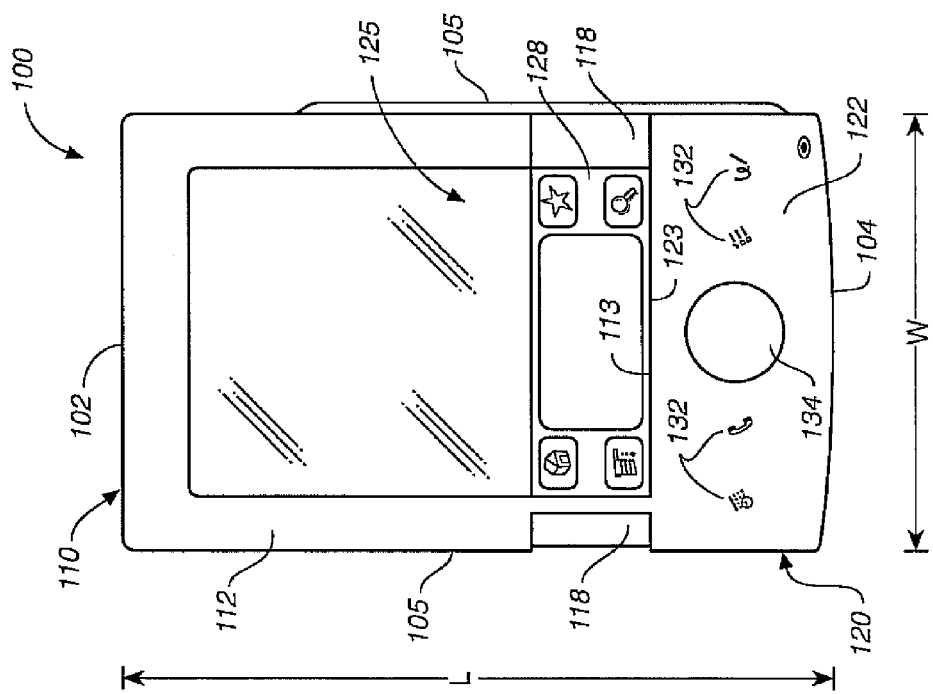

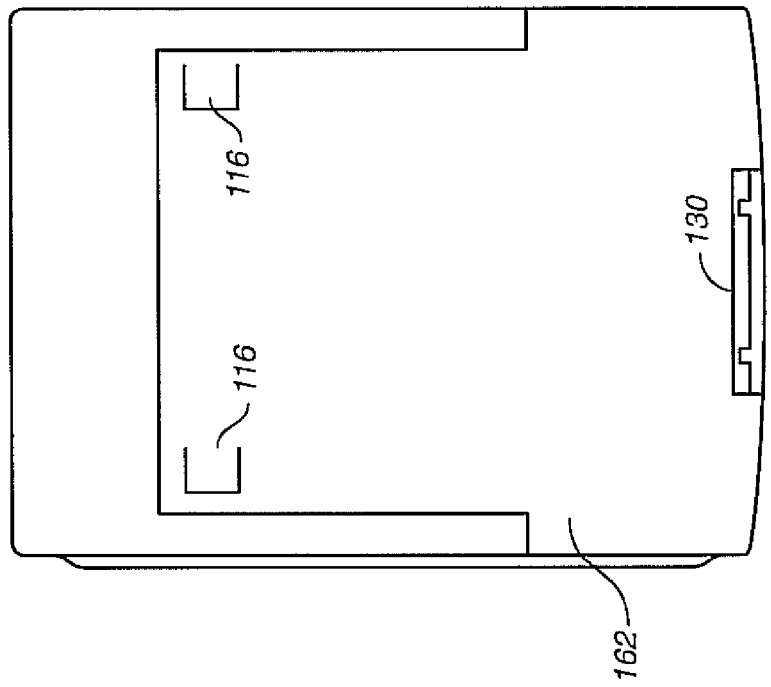
FIG._4
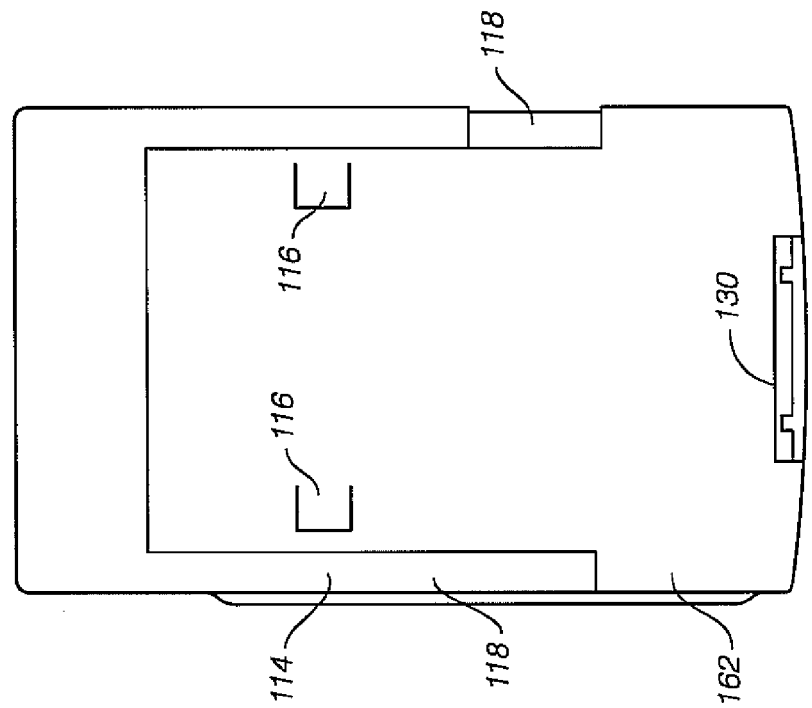
FIG._3

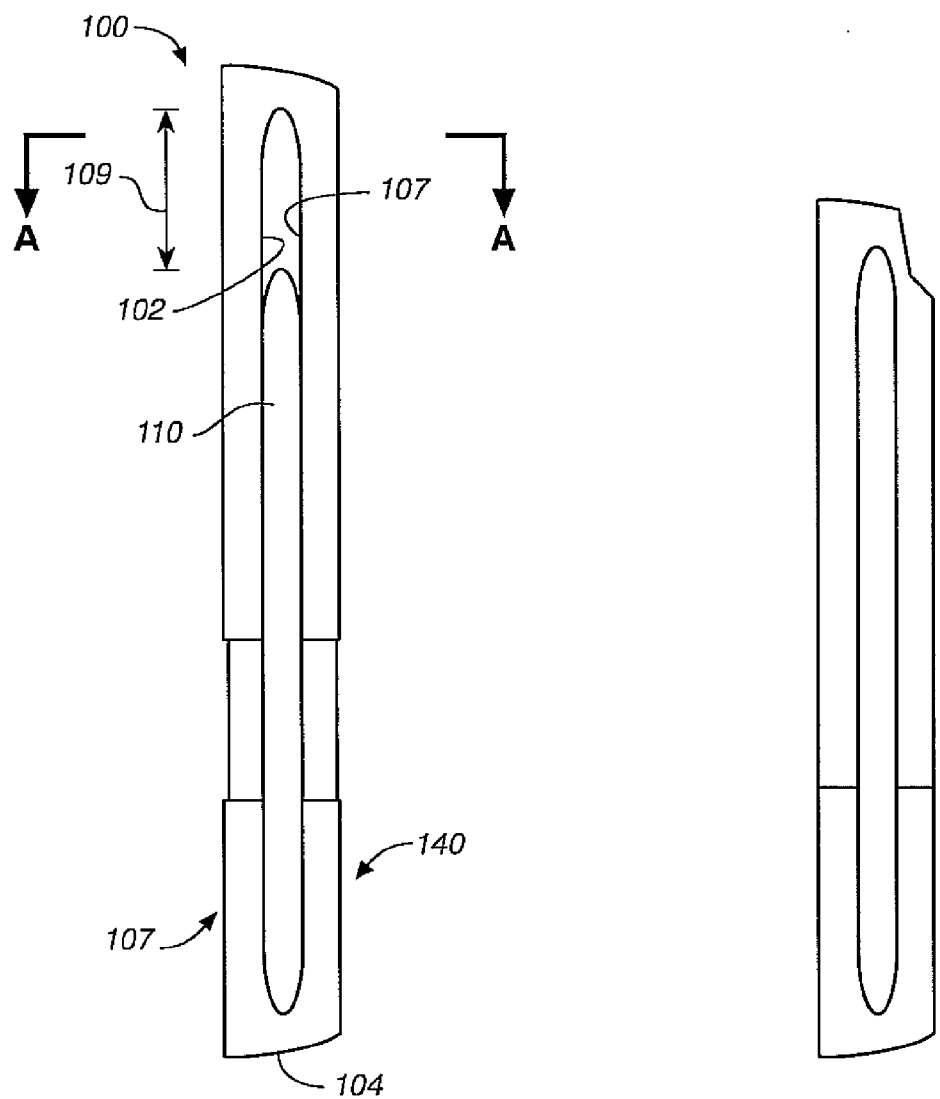
FIG._5   FIG._7
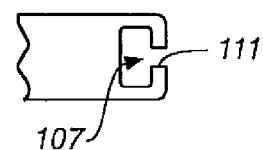
FIG._6

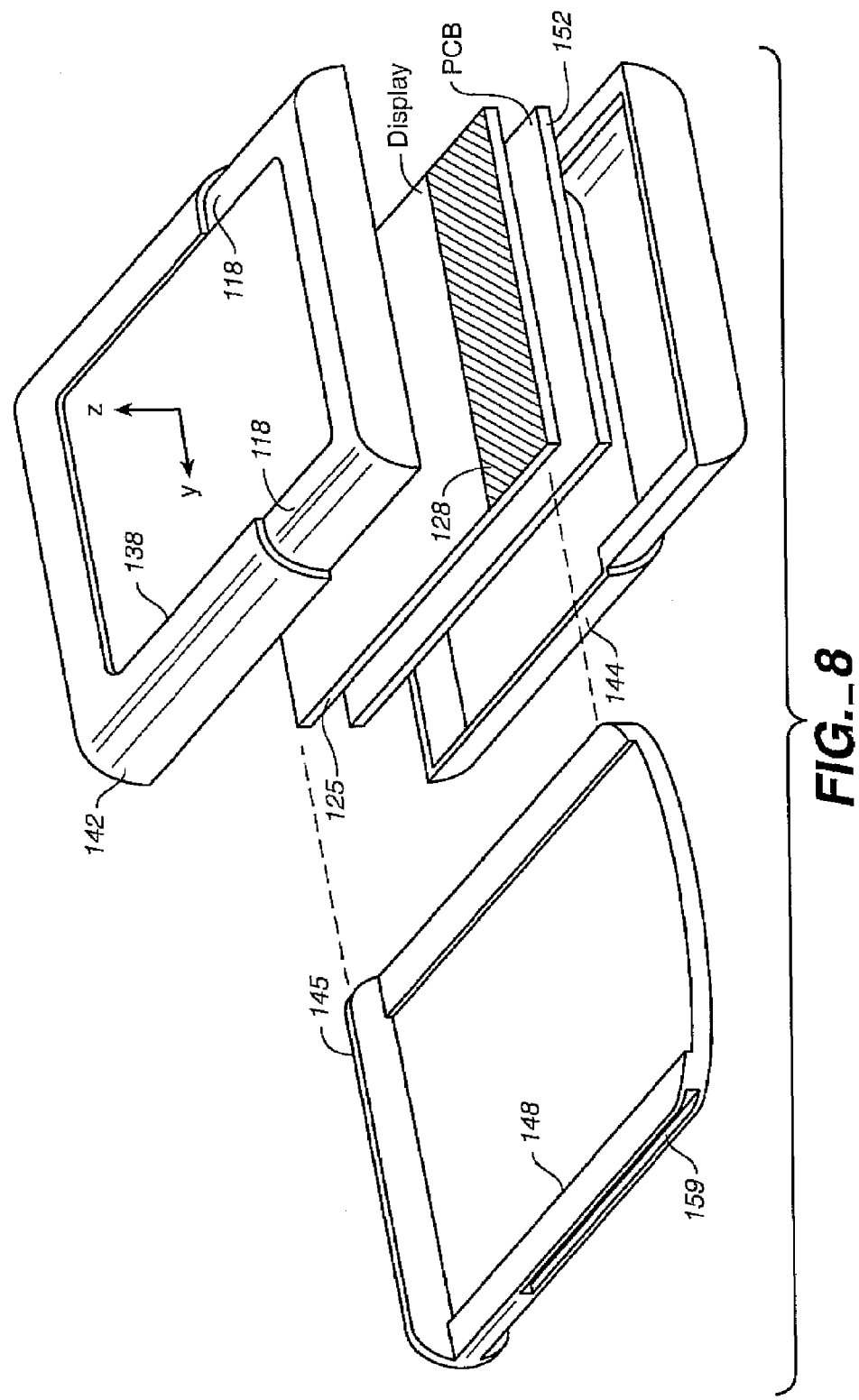
FIG._8

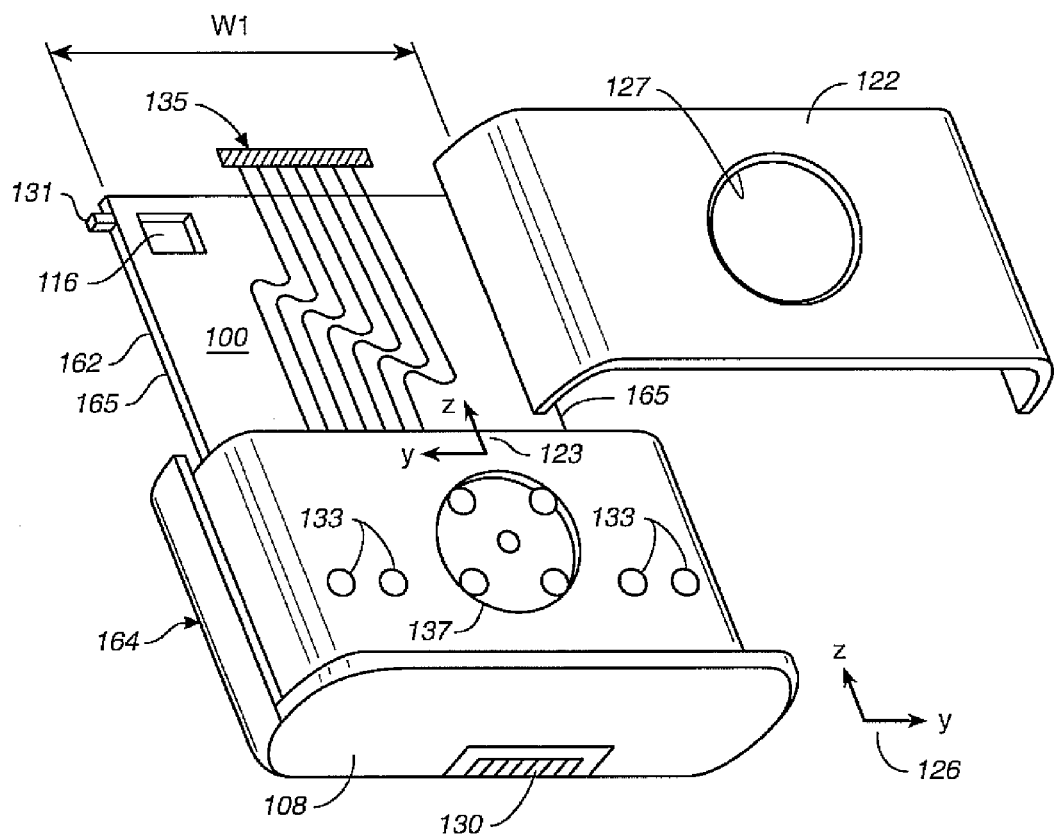
FIG._9

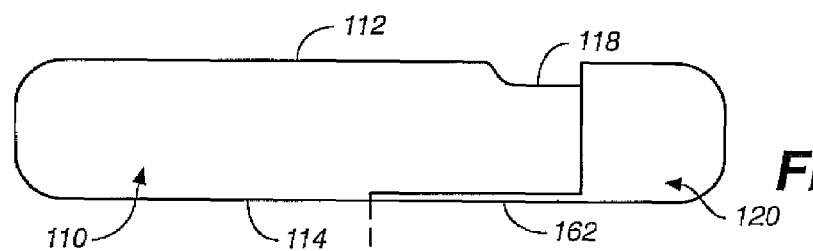
FIG._10
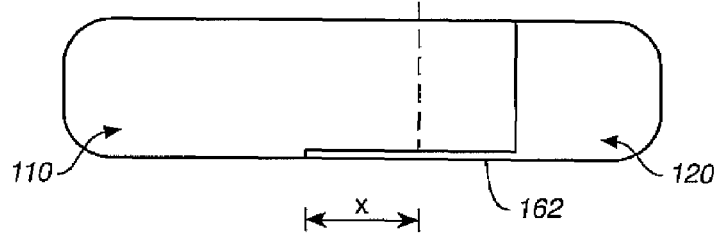
FIG._11
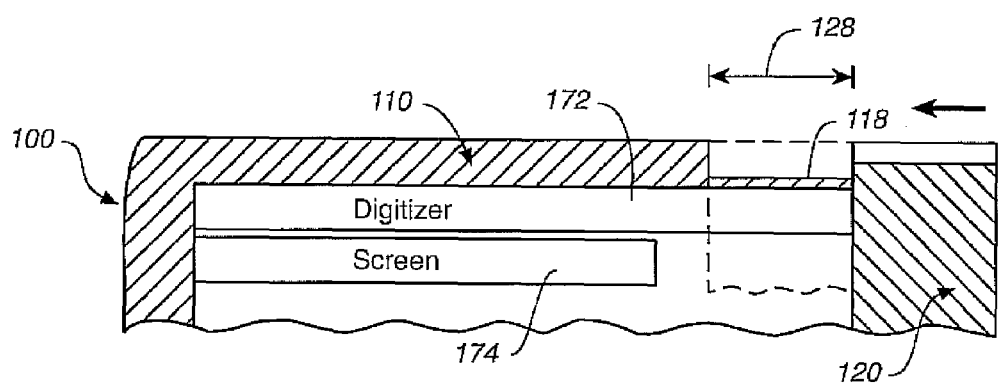
FIG._12

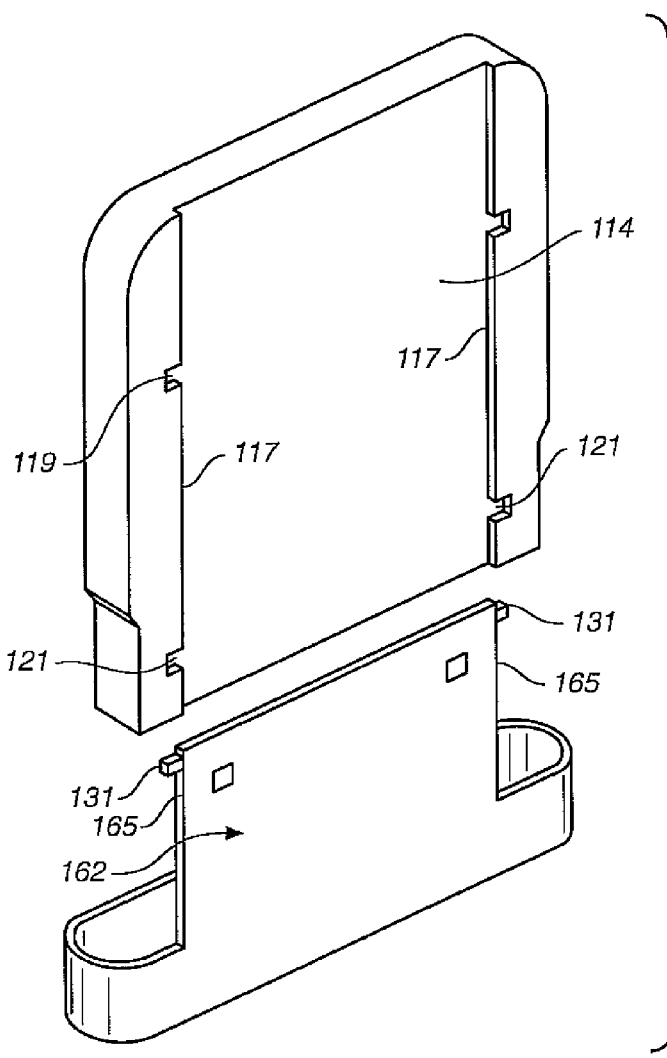
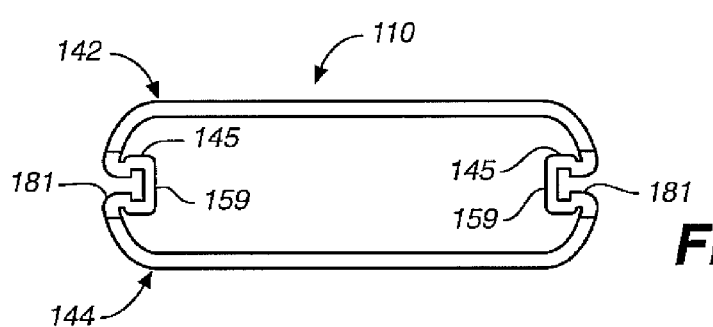
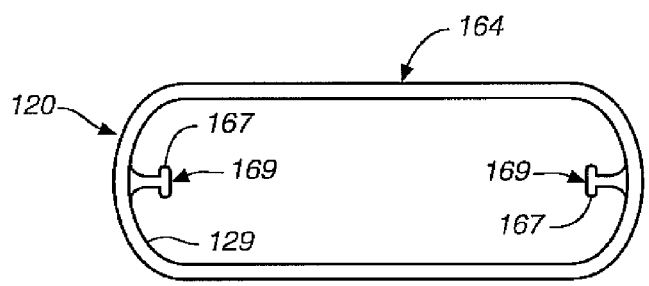

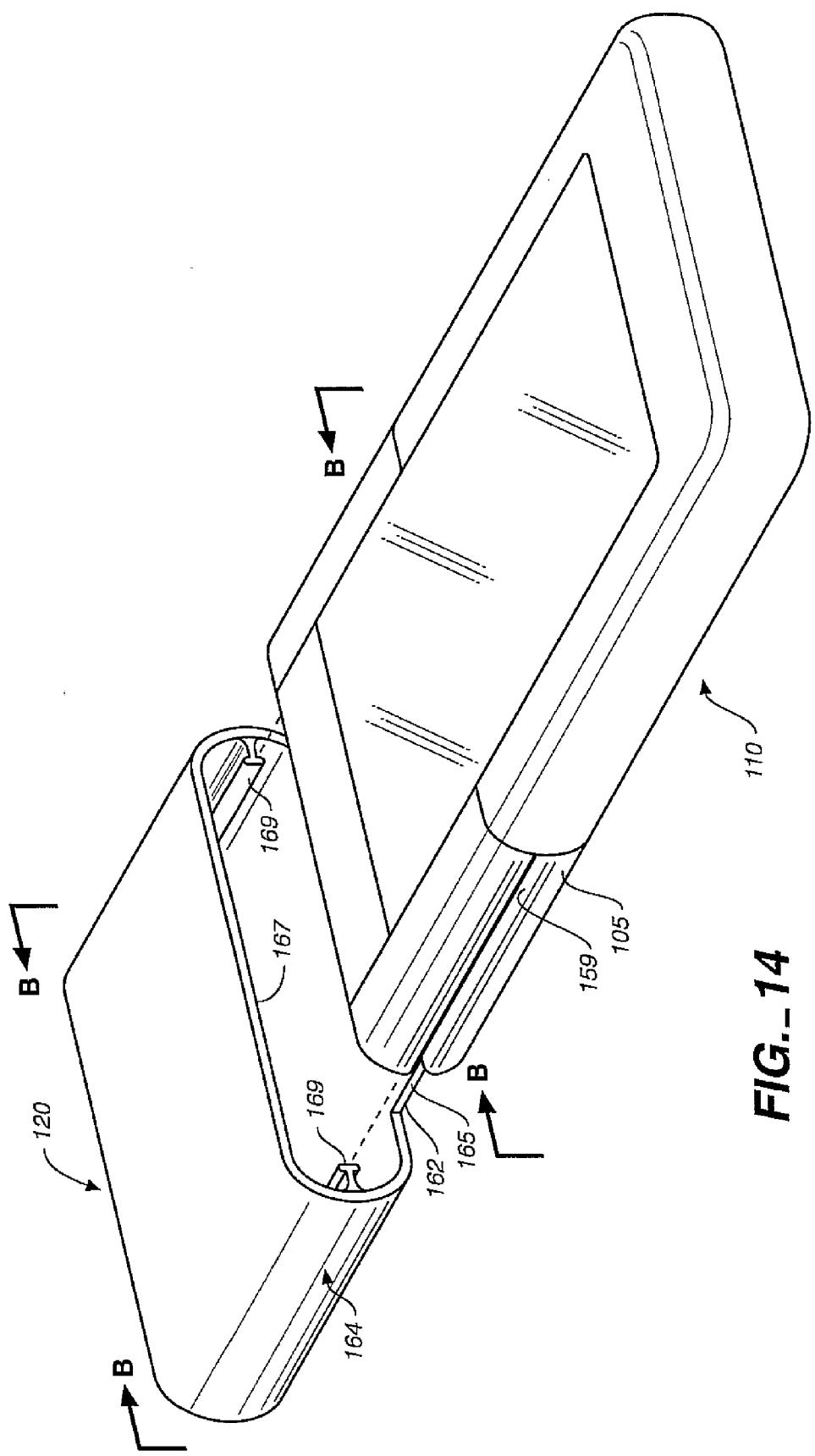
FIG._14

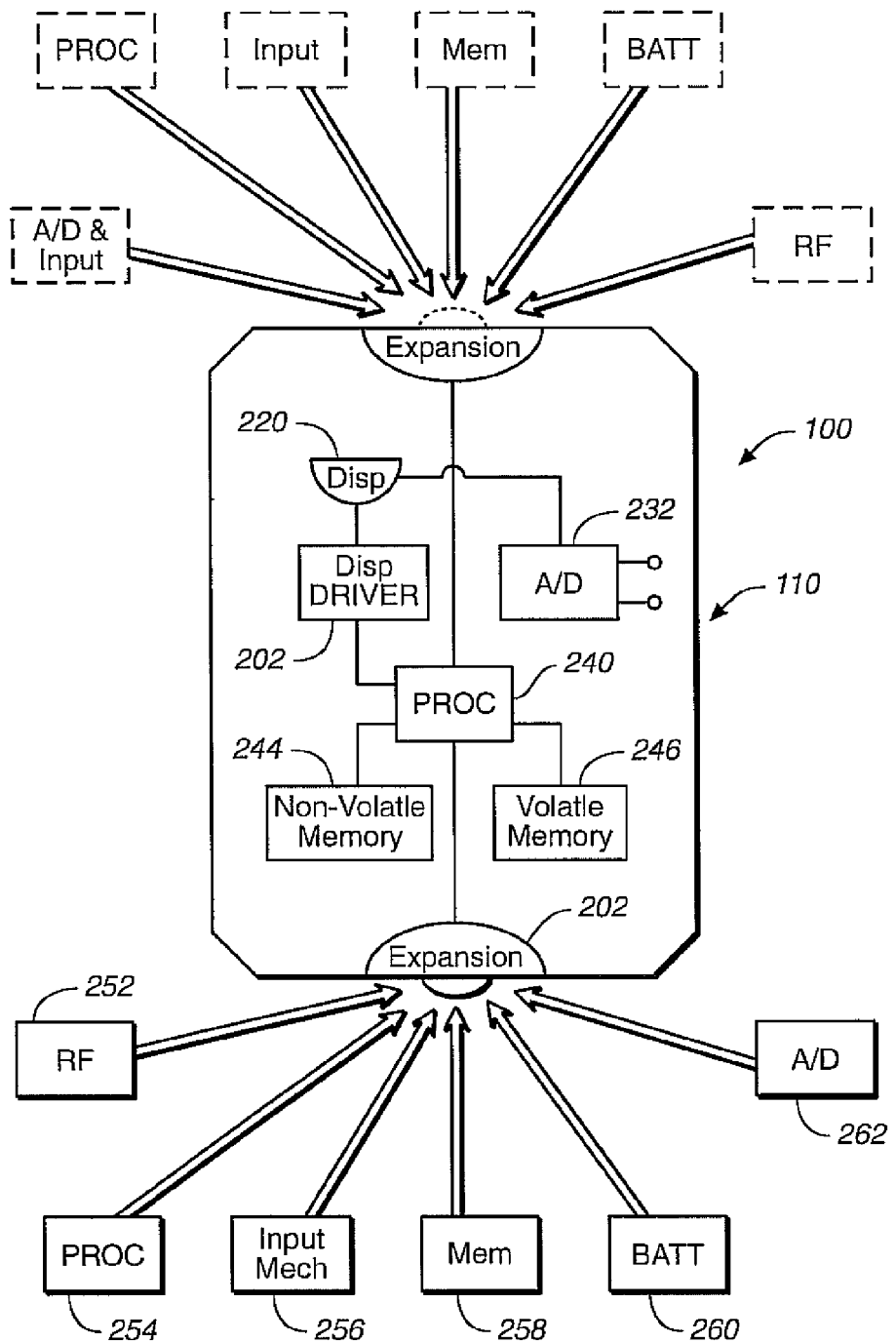
FIG._17

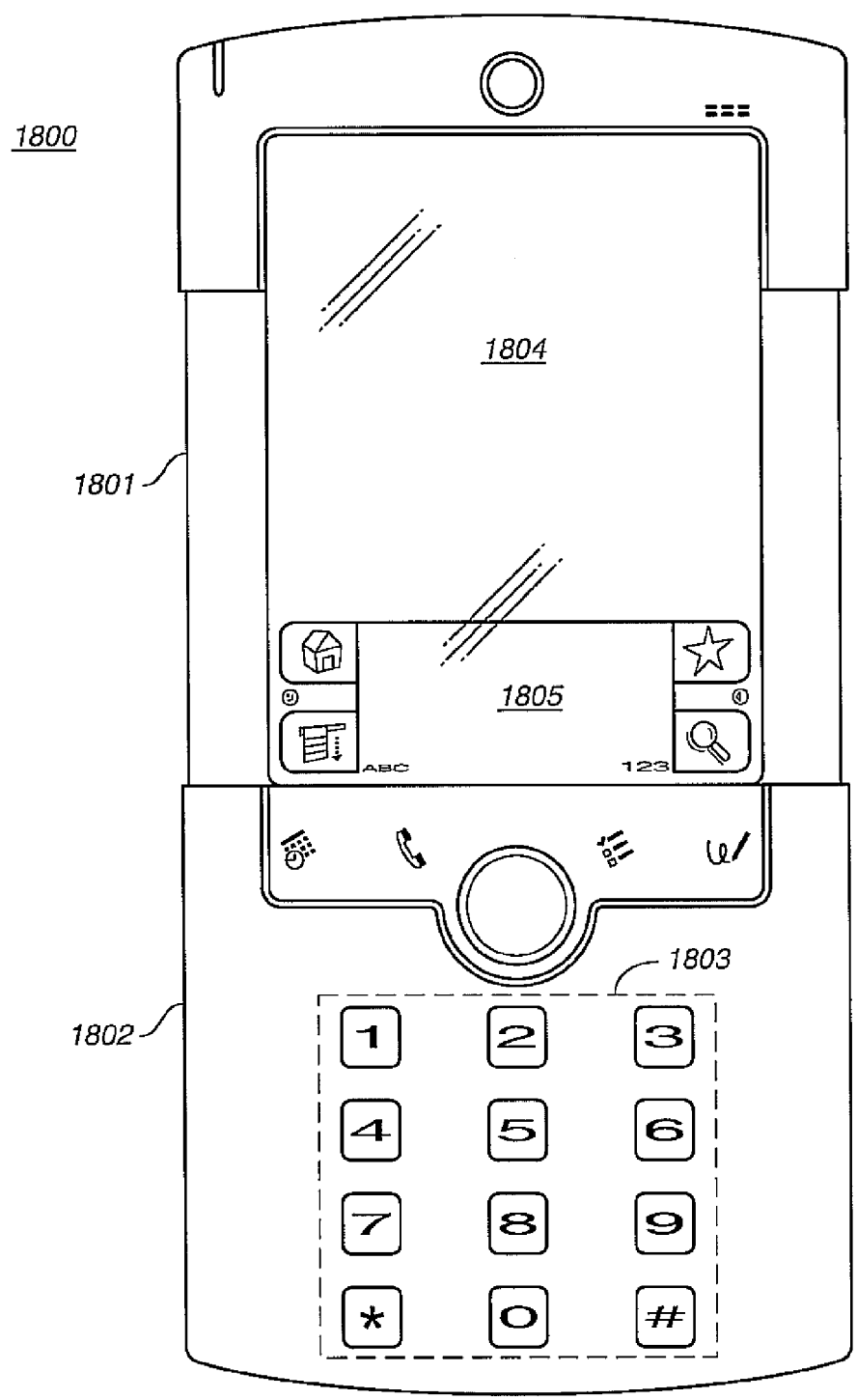
FIG._18

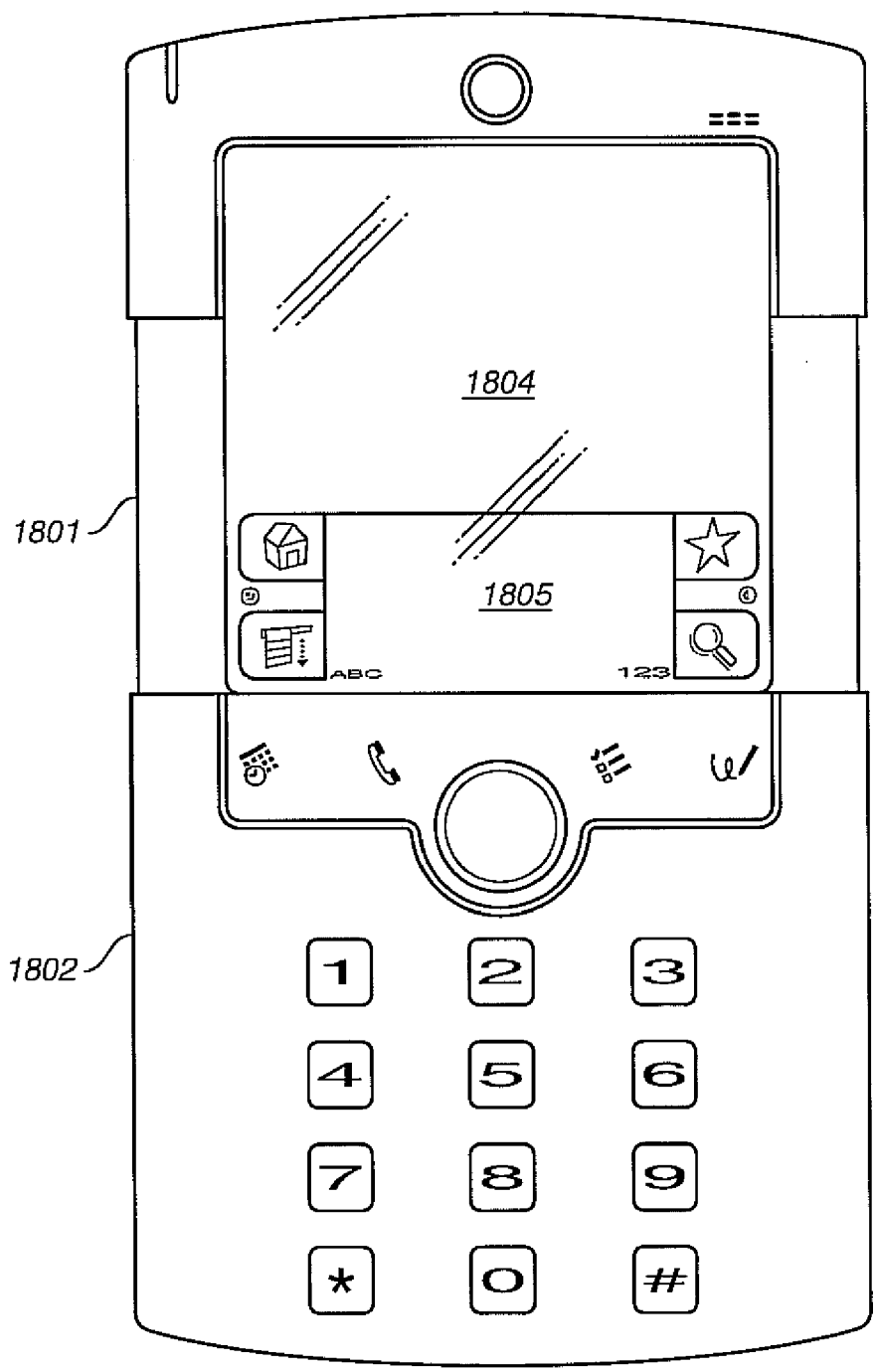
FIG._19

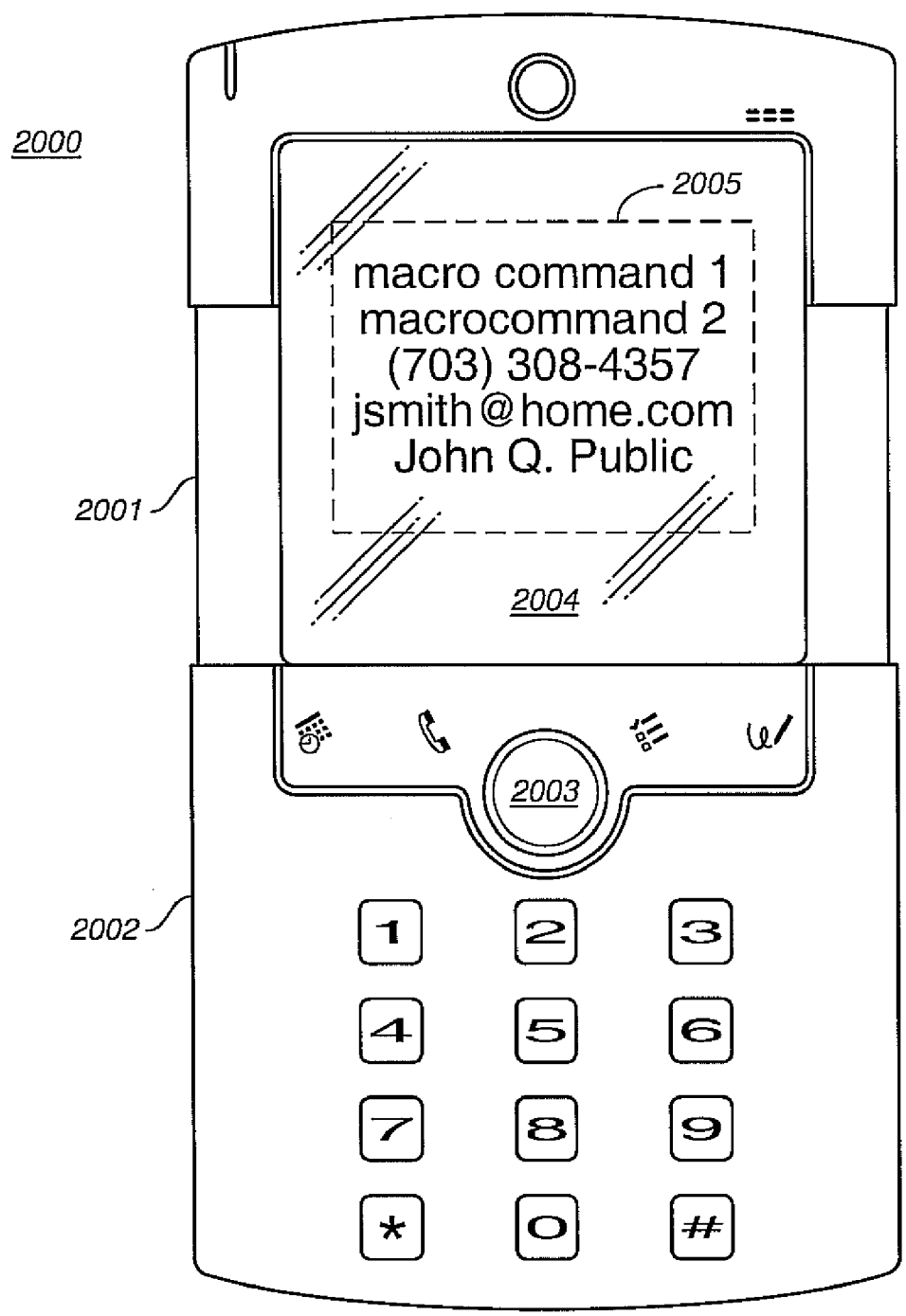
FIG._20

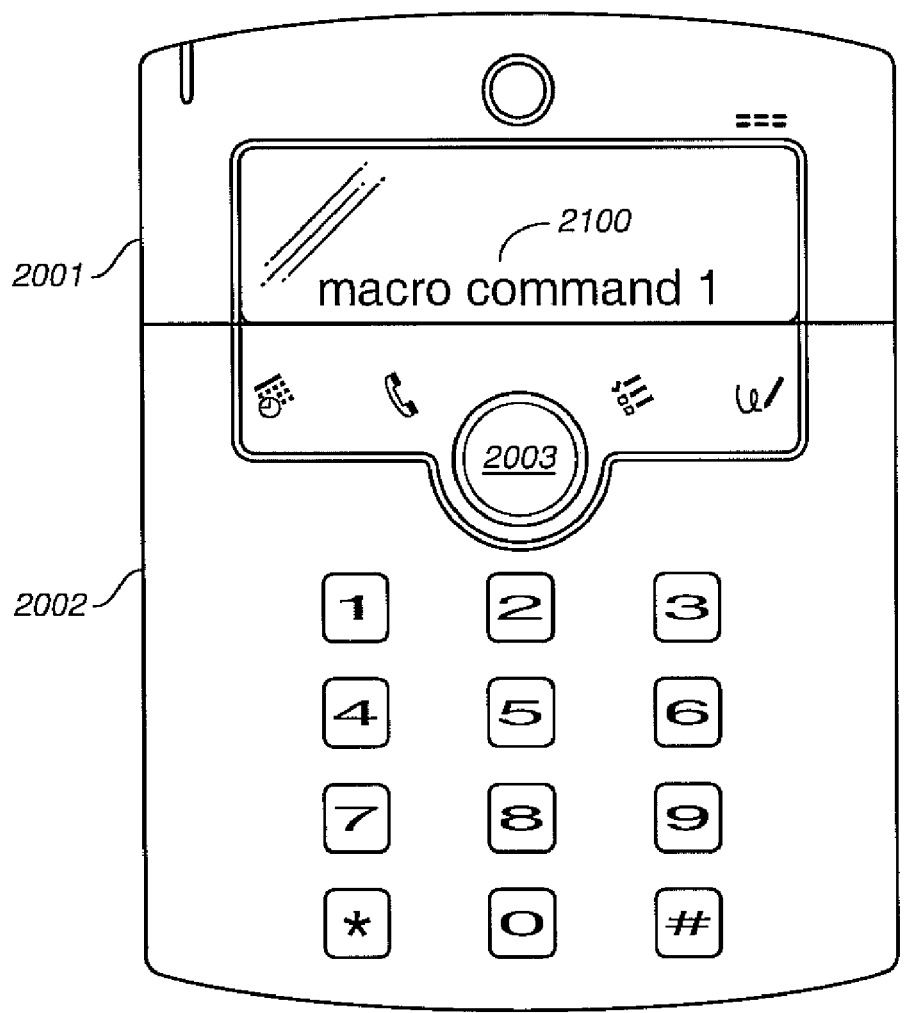
FIG._21

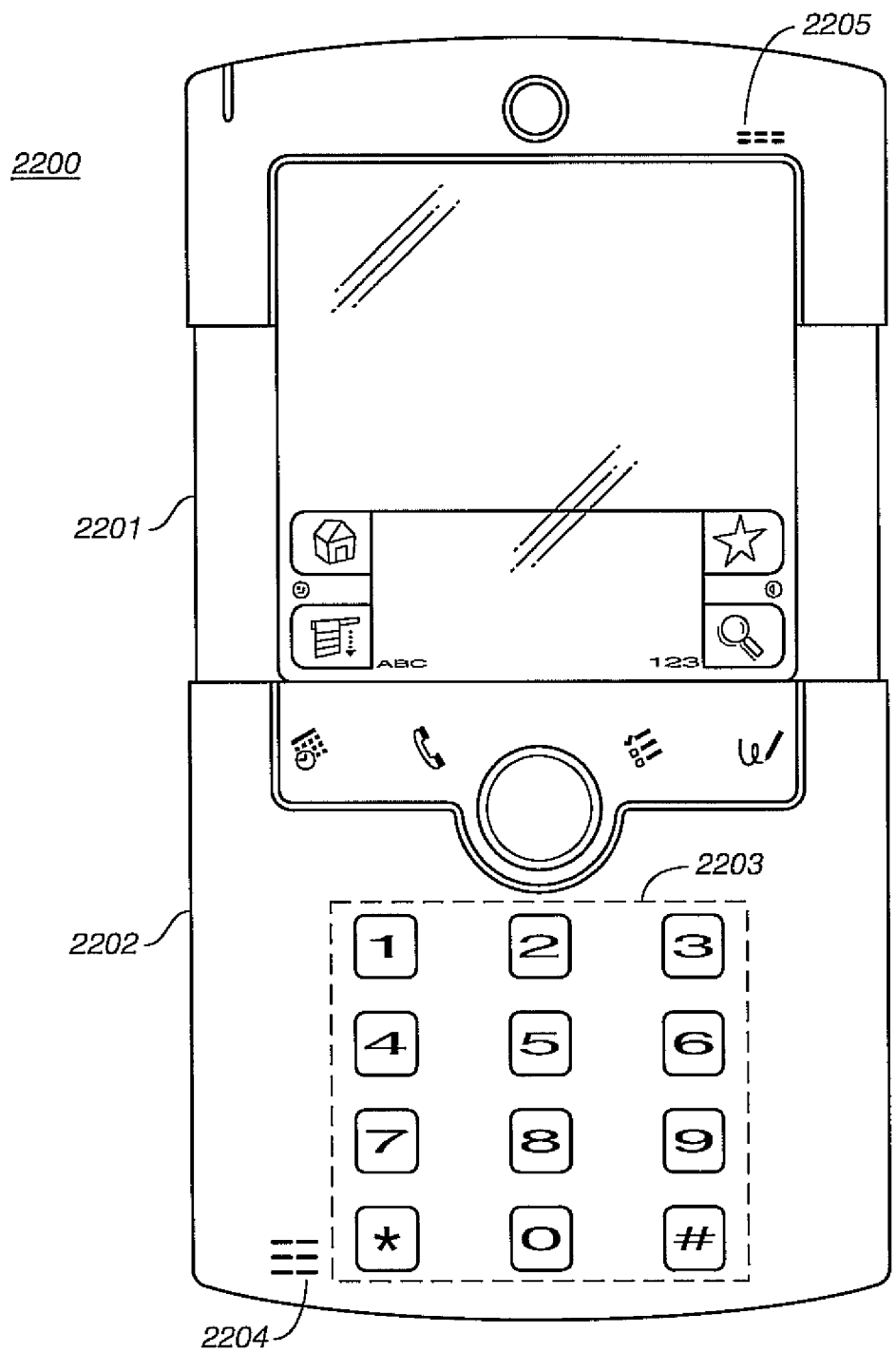
FIG._22

HANDHELD COMPUTER HAVING MOVEABLE SEGMENTS THAT ARE INTERACTIVE WITH AN INTEGRATED DISPLAY

RELATED U.S. APPLICATIONS

This patent application is a continuation-in-part of, and claims priority to, U.S. patent application Ser. No. 09/932,213, "Handheld Computer Having Moveable Segments That Can Be Adjusted to Affect a Size of the Handheld Computer", filed Aug. 17, 2001.

FIELD OF THE INVENTION

The present invention relates to handheld computers. In particular, the present invention relates to a handheld computer comprised of a moveable assembly that is adjustable to affect a size of the handheld computer.

BACKGROUND ART

Handheld computers, typically referred to as personal digital assistants (PDAS), are intended to be mobile devices. In general, small sizes are desired for handheld computers to enhance mobility. However, there are constraints to how small a handheld computer can be for convenience of the user. In particular, certain characteristics of handheld computers require a minimum amount of space on the exterior housing of the handheld computer.

Most handheld computers require a minimum size display. The minimum display size is set by balancing considerations such as mobility with the need for the user to view data, such as personal management information, pictures, and text pages. For some handheld computers, the size of the display may also need to be large enough to provide a character input mechanism for the user. For example, some handheld computers incorporate character recognition logic as a primary means for the user to enter character data into the handheld computer. The displays for the handheld computer may be made to be contact-sensitive. A portion of the display may be combined with logic to provide an immediate character recognizer for recognizing gestures or strokes entered onto a portion of the display as characters. Other displays may be used to display a virtual keyboard. The immediate character recognition regions and virtual keyboards require the displays to be of a minimum size to support those kinds of character entry.

The size of the handheld computer typically must also accommodate mechanical actuators, such as buttons or pivot switches. These are typically placed on the same surface where the display is viewable to enable users to coordinate button actions with what is shown on the display.

As battery and printed circuit board technology becomes more advanced, the display size and mechanical actuators are increasingly becoming the primary factors that determine the size of the handheld computer. Reducing the length of the handheld computer requires sacrificing features of the display and/or buttons.

The functional integration of handheld devices has led to handheld computing devices that also function as wireless telephones. Conventional fixed placements of speaker and microphone in these integrated devices yield larger form factors that result in undesirable telephony experiences and do not provide for protection of the integrated display.

In fixed form factor devices the display is left exposed and unprotected from debris and facial oils during phone usage. Products that do provide protection with covers and such have the disadvantage of not allowing the user access to the hard phone and/or application buttons if they reside on the cover. This is due to the cover having to be folded or flipped away to provide access to the display during PDA use.

SUMMARY OF INVENTION

Embodiments of the invention provide for a handheld computer comprising a first segment moveably coupled to a second segment. The second segment can be positioned to overlay a portion of the first segment so as to reduce a length of the handheld computer. The handheld computer can be manipulated into a contracted position so that the second segment is overlaid over a portion of the display on the first segment. A position sensor detects the relative position of the first and second segments to provide feedback to the display.

In an embodiment, the display includes floating text, images, or icons or that may repositioned in response to changes in position of the second segment so that they remain visible. Icons that are associated with keys located at the edge of the second segment may be kept in proximity to the keys so as to enhance the association between the icons and the keys.

In another embodiment, the edge of the second segment that borders the display is used to underline a character string on the display. The character string may be one of a plurality of character strings displayed as a static list. Upon selecting or underlining a character string, a key or other actuator may be used to cause an instruction set associated with the character string to be executed. A character string that has an associated instruction set is generally a macro command with the instructions and character strings being freely selected.

A special type of macro command is an address command. Character strings such as names of an entity and/or their addresses (e.g., email addresses, IP addresses, or telephone numbers) may be displayed as an address command. Line selection of an address command initiates a communications application using the associated address (e.g., an email or telephone call.)

In yet another embodiment of the invention, a handheld computer provides integrated telephone functionality. The integrated device has two distinct elements that reconfigure relative to each other through a sliding mechanism. The lower element houses the numerical dialer keys and microphone for telephone functionality in addition to the navigation/application keys. The upper element houses the display/PCB/battery/speaker, etc.

The lower housing slides over a majority of the display module in the closed position. Advantages to this articulation are:

decreased overall length of the product for compact storage and/or one handed telephony usage;

protection of the display from debris and sharp objects during storage;

protection of the display from facial oils and chemicals during telephony modes when device is placed against face and ear;

provides a more ergonomically located 5 way center navigation and numerical buttons for data retrieval and telephone dialing;

partially exposed display is convenient for minimal PDA and/or telephony information display. Recess provides a degree of display protection.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 1 is a frontal view of a handheld computer having moveable segments configured in an extended position.

FIG. 2 is a frontal view of the handheld computer, with the moveable segments configured in a contracted position.

FIG. 3 is a back view of the handheld computer, with the moveable segments configured in an extended position.

FIG. 4 is a back view of the handheld computer, with the moveable segments configured in a contracted position.

FIG. 5 is a side view of the handheld computer, with the moveable segments configured in an extended position.

FIG. 6 is a cross-sectional view of FIG. 5, cut along lines A-A

FIG. 7 is a side view of the handheld computer, with the moveable segments configured in a contracted position.

FIG. 8 is an exploded isometric view of a first moveable segment of the handheld computer.

FIG. 9 is an isometric view of a second moveable segment of the handheld computer.

FIG. 10 is a side view of a handheld computer formed by a first segment slideable connected to a second segment, the two segments being positioned in an extended position.

FIG. 11 is a side view of a handheld computer formed by a first segment slideable connected to a second segment, the two segments being positioned in a contracted position.

FIG. 12 is a partial; side cross-sectional view of the handheld computer formed by a first segment slideable coupled to a second segment.

FIG. 13 is a back isometric view of a handheld computer, showing a first set of connecting mechanisms for moveably connecting two segments of a handheld computer.

FIG. 14 is a front isometric view of handheld computer; showing a second set of connecting mechanisms for moveably connecting two segments of a handheld computer.

FIG. 15 is a cross-sectional view taken along lines A-A of FIG. 13.

FIG. 16 is a cross-sectional view taken along lines B-B of FIG. 13.

FIG. 17 illustrates a hardware diagram for a handheld computer coupleable to one or more accessory devices.

FIG. 18 shows a handheld computer in a fully extended configuration with a floating display of a visual object.

FIG. 19 shows the handheld computer of FIG. 18 in a partially closed configuration with a rearranged display of the visual object.

FIG. 20 shows a handheld computer with a display of a list of macro commands.

FIG. 21 shows the handheld computer of FIG. 20 with a macro command selected from the displayed list.

FIG. 22 shows the handheld computer of FIG. 18 integrated with a wireless telephone.

DESCRIPTION OF THE PREFERRED EMBODIMENTS

Embodiments of the invention describe a handheld computer having moveable segments to affect a size of the handheld computer. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

In an embodiment, a handheld computer includes multiple segments that are moveably connected and adjustable to affect an overall size of the handheld computer.

In one embodiment, a first segment is moveably connected to a second segment. The first segment includes a contact-sensitive display. The second segment includes an input mechanism. The first segment and second segment can be moved between a contracted position and an extended position. In the contracted position, the second segment is overlaid relative to the first segment so that a portion of the display assembly is not accessible. In the extended position, the second segment is moved away from the display assembly so that all of the display assembly is accessible to a user of the handheld computer.

In another embodiment, a second segment is slideably coupled to the first segment. The second segment can be positioned relative to the first segment to overlay and reduce an area of the contact-sensitive display assembly.

Moveable refers to movement in one or more directions, including rotations, and combinations of motions. Slideable means movement primarily in one direction.

A display surface is accessible if the surface can be contacted by the user. The display surface does not have to be contact-sensitive to be accessible. The term accessible refers only to a physical relationship between the display and other surfaces of the handheld computer. If the display surface is accessible, then that display surface is not being shielded by another component or surface of the handheld computer.

Among other advantages, embodiments of the invention allow for a handheld computer to vary the overall length of the handheld computer by adjusting the position of the segments relative to one another. A user can maintain the handheld computer in a shortened or contracted state if the user does not need to use certain features that can be covered by the segments in the contracted position. For example, portions of the display dedicated to or used primarily for character entry may be covered by the contracted segments of the handheld computer if the user does not need to use the character entry feature of the handheld computer. This allows the user to extend the handheld computer for limited instances when character entry is desired. Therefore, minimization of the size of the handheld computer is not as constrained by character entry features or input mechanisms.

Another advantage is that buttons or other mechanical input mechanisms can be more centrally disposed on the handheld computer. This allows the user to operate the device with one hand, with a thumb or extending to manipulate the buttons. In this configuration, the weight of the handheld computer is more evenly distributed to lessen the strain on the user's hands and thumbs.

B. Configurations for Handheld Computer With Moveable Segments

FIG. 1 is a front view of a handheld computer 100, under an embodiment of the invention. The handheld computer 100 includes a first segment 110 moveably coupled to a second segment 120. In FIG. 1, second segment 120 is fully extended in relation to first segment 110.

The first segment 110 and/or the second segment 120 may be moved along an axis to affect a size of the handheld computer. The movement by the first segment 110 and/or the second segment 120 maybe linear. In one embodiment, one segment slides relative to another segment to affect the size of handheld computer 100.

A front surface 112 of first segment 110 provides access to a contact-sensitive display assembly 125. The display assembly 125 may include an immediate character recognition region 128, and an output region 126. A front panel 122 of second segment 120 provides a plurality of actuatable mechanisms.

The handheld computer 100 may be referenced to a top 102 and a bottom 104, and a pair of lateral sides 105. In the extended position, a top edge 123 of second segment 120 is positioned proximally to a bottom edge 113 of first segment 110. A length L of handheld computer 100 is defined by a distance between top 102 and bottom 104. A width W of handheld computer 100 is defined by a distance between lateral sides 105, 105.

Embodiments of the invention provide for the length of handheld computer 100 to be variable. In one embodiment, second segment 120 is moveable to position bottom 104 closer or farther away from top 102 on first segment 110.

The first segment 110 includes a reduced section 118. The reduced section 118 is formed by regions of first segment 110 that have a reduced peripheral thickness. The overall peripheral thickness of reduced section 118 enables second segment 120 to move over first segment 110, as shown by FIG. 2. The reduced section 118 may be located on first segment 110 adjacent to second segment 120. In one configuration, reduced section 118 include recesses formed into front surface of first segment 110, between each lateral side 105 and display assembly 125. The reduced section 118 may include one or more recesses that extend peripherally around first segment 110.

The display assembly 125 may be formed by a combination of a digitizer pad and screen. The screen and digitizer may be overlaid on all or portions of each other. In one implementation, the immediate character recognition region 128 may be formed by the digitizer pad, without the screen. Logic may be included with handheld computer 100 to recognize characters entered onto the digitizer pad through contact by a stylus type device. This configuration for display assembly 125 may correspond to a GRAFFITI handwriting area provided on handheld computers operating a PALM OS. In another implementation, immediate character recognition region 128 may be formed with the digitizer pad and digitizer completely overlaid with each other. Logic may be implemented to recognize characters entered onto the screen and digitizer combination. This configuration may correspond to a jot recognition area of a handheld computer operating a POCKET PC operating system.

The actuatable mechanisms provided on front panel 122 of second segment 120 include a combination of actuation mechanisms 132, as well as a multi-directional component 134. The actuation mechanisms 132 are mechanisms that have one of two states actuated and not actuated. The multi-directional component 134 has multiple states-one state for each direction it can be actuated in, and a non-actuated state. The multi-directional component 134 may also have a center actuation state, corresponding to being centrally contacted or pressed straight down. The actuatable mechanisms 132 and/or multi-directional component 134 may be formed from buttons, contact-sensitive surfaces, or other mechanical switches.

In one embodiment, actuatable mechanisms 132 comprise a thin rigid membrane that is disposed over the buttons to create actuation surfaces. An example such an embodiment is shown in FIG. 8.

The immediate character recognition region 128 uses a look-up table or other similar data structure to match a shape of a contact stroke with an input. In a typical use, immediate character recognition region 128 is used for character entry, and actuatable mechanisms 132 and multi-directional member 134 are used for selection of displayed data.

FIG. 2 is a front view of handheld computer 100 in a contracted position. In the contracted position, second segment 120 is moved over the portion of first segment 110 corresponding to reduced sections 118. A top edge 123 of second segment 120 is moved to be distal to bottom edge 113 (FIG. 1) of first segment 110. The top edge 123 moves a distance of X from the extended position to the contracted position. As a result, the overall length L of handheld computer 100 is reduced by X when handheld computer 100 is in the contracted position.

In one embodiment, distance X may correspond to a length of immediate character recognition region 128. As a result, front panel 122 of second segment 120 is positioned in front of immediate character recognition region 128 when handheld computer 100 is in the contracted state. The immediate character recognition region 128 is no longer accessible to a user when second segment 120 is moved into the contracted position.

According to one configuration, handheld computer 100 is in a character entry mode in the extended position. In the character entry mode, handheld computer uses a feature such as the display to receive characters. Other embodiments may provide for a mechanical keyboard that can be used to enter characters in the character entry mode. In the contracted position, handheld computer 100 may be in a selection mode. The actuatable mechanisms 132 and multi-directional member 134 may be used to make selections based on information provided on the screen of display assembly 125. For example, menu items, data entries, or applications may be selected using actuatable mechanisms 132. The actuatable mechanisms may cover or otherwise overlap the character entry feature when handheld computer 100 is in the selection mode.

FIG. 3 is a back view of handheld computer 100 in the extended position. A back panel 162 of second segment 120 is disposed over a back surface 114 of first segment 110. A pair of coupling features 116 are formed into back panel 162. The coupling features 116 are for detachably coupling to accessory devices, such as modems. The reduced section 118 is also disposed on back surface 114 of first segment 110. In the extended position, back panel 162 of second segment 120 can be moved into the extended position to expose reduced section 118.

A connector 130 is provided on a bottom surface 135. In one configuration, connector 130 is a feature of second segment 120, and bottom surface 135 is a region on second segment 120. The connector 130 may be used to couple to an accessory device, such as a cradle for a docking port. The connector 130 may also be used to couple to an accessory device that is secured to the back of handheld computer 100 using coupling features 116.

FIG. 4 is a back view of handheld computer 100 in the contracted position. The second segment 120 is moved over reduced sections 118, shrinking the length of handheld computer 100. The bottom surface 135 and connector 130 are not affected when handheld computer 100 is in the contracted position.

FIG. 5 is a side view of handheld computer 100 in the extended position. The lateral side 105 may include one or more accessory slots 107. The accessory slot 107 is formed as a partially-enclosed opening that extends lengthwise from near top 102 towards bottom 104. The accessory slot 107 is shown engaged with a stylus 140. In the extended position, accessory slot 107 is larger than stylus 140, so that rail gap 109 is formed between the top of the rail and stylus 140.

A lengthwise opening in accessory slot 107 permits for extensions to connect onto the stylus 140 or other stylus shaped member contained with accessory slot 107. The extensions can extend out of accessory slot 107 to form another type of accessory device. For example, a spine may be substituted for stylus 140. A cover portion may be attached to the spine using the lengthwise opening in accessory slot 107.

FIG. 6 is a cross-sectional view of FIG. 5, cut along lines A-A. The accessory slot 107 includes a lengthwise opening 111 that is formed along a majority of the rail's length. The opening 111 permits for devices that engage accessory slot 107 to include sections that extend out of the accessory slot 107.

FIG. 7 is a side view of handheld computer 100 in the contracted position. The accessory slot 107 may be reduced in length, but still long enough to accommodate stylus 140.

The accessory slot 107 may be a housing feature on one or both of the other lateral side 105. In an embodiment, each lateral side 105 includes accessory slot 107. One of the rails 107 may be used to hold stylus 140. Another accessory slot 107 may be used to hold the spine of another accessory device.

C. Construction of Moveable Segments

FIG. 8 is an exploded isometric view of handheld computer 100, showing construction of first segment 110. The first segment 110 includes a front shell 142 and a back shell 144. The display assembly 125 is positioned between the front shell 142 and the back shell 144. A printed circuit board 152 is positioned underneath display assembly 125. The midframe 145 forms a peripheral strip of the housing for handheld computer 100, between front shell 142 and back shell 144.

In one construction, display assembly 125 is located within a space provided by front shell 142. The front shell 142 includes an opening 138 where display assembly 125 is accessible to a user for viewing or for contact. The reduced section 118 is formed on a bottom portion of front shell 142 and back shell 144. The reduced section 118 has dimensions in the vertical direction Z, and in the lateral direction Y, that are reduced in comparison to the remainder of front shell 142 and back shell 144.

The midframe 145 includes an opening 148 to retain PCB 152. The midframe 145 may be formed by three of four orthogonally aligned legs that form a perimeter portion of handheld computer 100. Each lateral side 105 of handheld computer 100 includes a surface comprising portions of front shell 142, back shell 144, and midframe 145. As described in greater detail with FIGS. 11 and 12, midframe 145 is provided one or more rails 159 for receiving a connecting element of second segment 120. The midframe 145 may extend to both lateral sides 105 of handheld computer 100, and each lateral side may have rail 159 formed therein.

The display assembly 125 may be formed from a digitizer combined with a screen. The immediate character recognition region 128 may be located towards the bottom of first segment 110.

As described, back shell 144 includes portions of reduced sections 118, that mirror the shape and location of the portion of reduced section in front shell 142. When front shell 142 and back shell 144 are combined, the resulting reduced section 118 form a region that allows for second segment 120 to slide over first segment 110.

In an embodiment, midframe 145 is formed from a moldable material such as plastic or rubber. The first segment 110 and second segment 120 may be plated with metal or other hard materials.

FIG. 9 is an isometric view of second segment 120 for handheld computer 100. The second segment 120 includes a housing 164 combined with back plate 162. The back plate 162 slides along the back surface of handheld computer 100. The housing 164 has dimensions in the vertical direction Z, and in the lateral direction Y, that match those dimensions of first segment 110. In the contracted position, top edge 123 of second segment 120 is abutted against bottom edge 113 of first segment 110. The dimensions of housing 164 enable second segment 120 to be combined with first segment 110 to give the appearance that one housing contains components of both first segment 110 and second segment 120.

In an embodiment, front panel 122 of second segment 120 is mounted on top of an interior panel 126. The interior panel 126 includes pressable mechanical actuators, including actuators 133 for input mechanisms 132, and actuators 137 for multi-directional member 134. The front panel 122 is a thin, flexible membrane that can be flexed in regions corresponding to the position of actuators 133 and 137. For example, front panel 122 maybe a thin sheet of metal that can be pressed inwards at select locations corresponding to where actuators 133, 137 reside on interior panel. Markings may be provided on front panel 122 to indicate location of the actuators 133, 137. An opening 127 may house a joystick, pad, cross-member or other device for multi-directional member 134. The device housed within opening 127 may be used to selectively contact one or more of the actuators 137.

A flex cable 135 may be extended from within housing 164. The flex cable 135 may connect to the actuators 133, 137 to extend communications from those actuators to the PCB 152. The flex cable 135 is provided on a front surface of back plate 162. The back plate 162 is moveable a distance X along the back surface 114 of first segment 110. The coupling features 116 may be shaped as openings on back plate 162, to enable attachment of mechanical couplings extended from an accessory device.

The second segment 120 includes a bottom surface 108 for handheld computer 100. The bottom surface 108 provides access to connector 130. Access to connector 130 is not altered as second segment 120 is moved between the contracted position and the extended position. While bottom surface 108 is shown to be relatively flat and orthogonal to front panel 122 embodiments of the invention provide for bottom surface 108 to be contoured into the shape of the back plate 162 and front panel 122. Furthermore, connector 130 maybe disposed along both a bottom and back plane.

The back plate 162 includes lateral sides 165, 165. A distance W1 between lateral sides 165 is less than the distance W between lateral sides 105 of first segment 110 (See FIG. 1). As will be described with FIG. 13, lateral sides 165 may be shaped to be substantially liner in order to engage corresponding ridges 117, 117 on the back surface 114 of first segment 110. A connecting member 131 is positioned towards the top of back plate 162. As will be described in FIG. 14, the connecting member 131 is configured to engage the ridges 117 on the back surface 114 of first segment 110.

FIG. 10 is a simplified side view of first segment 110 and second segment 120 in the extended position. The reduced section 118 of first segment 110 is exposed. The back panel of second segment 120 is provided adjacent back surface 114 of first segment 110, opposing the front surface 112.

In FIG. 11, back panel 162 is moved the distance X along the bottom surface 114. The direction is unilateral, so that back panel 162 is sliding along back surface 114. The second segment 120 is moved over the reduced sections 118 of first segment 110.

FIG. 12 is a side cross-sectional view of handheld computer 100, showing first segment 110 and second segment 120 configured with respect to display assembly 125. FIG. 11 is a partial view, showing only a thickness of handheld computer 100 corresponding to where display assembly 125 is housed.

In one embodiment, display assembly 125 comprises a digitizer 172 combined with a screen 174. This construction provides for a contact-sensitive display assembly 125. Input may be entered onto display assembly 125 through contact with digitizer 172.

In an embodiment, immediate character recognition region 128 may be formed by extending digitizer 172 beyond screen 174 in the lengthwise direction. The result is that input can be received in immediate character recognition region 128, but output cannot be displayed.

Other embodiments that use immediate character recognition region 128 may combine digitizer 172 and screen 174. The immediate character recognition region 128 may be a selectable feature that appears in a designated regions of the viewable display. In most conventions, immediate character recognition region 128 appears towards the bottom of the viewable display. This position also corresponds towards a bottom of first segment 110.

The immediate character recognition region 128 of display assembly 125 may correspond to the location of reduced section 118 of first segment 110. Therefore, when second segment 120 is moved into the contracted position, second segment 120 is positioned over immediate character recognition region 128. The contracted position of handheld computer 100 may correspond to a selected mode where character entry is not possible. However, since input mechanisms 132 (FIG. 1) and multi-directional member 134 (FIG. 1) are accessible, data may be selected and displayed when handheld computer 100 is in the contracted position.

D. Attachment of Moveable Segments for Handheld Computer

FIG. 13 is a back isometric view of handheld computer 100, showing a first set of connecting mechanisms for moveably connecting first segment 110 and second segment 120 together on the back side of handheld computer 100. In an embodiment, second segment 120 is provided connecting members 131 on lateral sides 165 of back plate 162. Each connecting member 131 connects to a rail formed by ridges 117 on back surface 114 of handheld computer 100. In an embodiment, connecting members 131 are not removable from ridges 117, but can be slideably engaged with ridges 117 to move a distance X corresponding to the contracted and extended positions.

The connecting members 131 may be biased and moveable into lateral sides 165 of back plate 165. Engagement apertures 119 and bottom engagement apertures 121 may be provided along ridges 117. The engagement apertures 119 enable connecting members 131 to extend outward and lock second segment 120 into position so as to not be moveable. The connecting members 131 may be accessible from the back panel 162 to release the lock and allow second segment 120 to move relative to first segment 110. The top engagement apertures 119 may be locked into by connecting members 131 to place handheld computer 100 in the contracted position. The bottom engagement apertures 121 may be locked into by connecting members 131 to place handheld computer 100 in the extended position. The back plate 162 may be precluded from moving connecting members 131 beyond top and bottom engagement apertures 119, 121.

FIG. 14 is a front isometric view of handheld computer 100, showing a second set of connecting mechanisms for moveably connecting first segment 110 and second segment 120 together on the front side of handheld computer 100. The second set of connecting mechanisms shown in FIG. 13 may be used jointly with connecting mechanisms shown in FIG. 12. Alternatively, the first or second set of connecting mechanisms may be used alone. Other moveable connecting schemes for moveably joining first segment 110 and second segment 120 are also contemplated by this application.

The housing 164 of second segment 120 includes an interior 167. The interior 167 has connecting structures 169. The connecting structures 169 maybe elongate extensions of housing 164, extending at least partially lengthwise within housing 164.

In addition, lateral sides 105 of first segment 110 include rails 159 that are configured to receive connecting structures 169. The rails 159 maybe formed into the midframe 145 of first segment 110. Structures within rails 159 and/or on connecting members 169 may facilitate second segment 120 being retained in the contracted or extended position. For example, rails 159 may be provided with internal divots or dimples that require an additional sliding force to enable connecting members 169 to slide past their engagement. The connecting members 169 may include extensions that engage the divots or dimples to further facilitate a retaining engagement. The extensions may be biased. The retaining engagements may be positioned along the length of rails 159 and connecting members 169 corresponding to the contracted and extended positions of handheld computer 100. While the retaining engagements keep second segment 120 in a fixed relationship relative to first segment 110, the retaining engagements can be overcome to enable second segment 120 to slide back and forth. However, an embodiment of the invention provides that second segment 120 cannot be detached from first segment 110.

FIG. 15 is a cross-sectional view taken along lines B-B of FIG. 14, illustrating rails 159 of first segment 110. The rails 159 are provided on midframe 145, between front shell 142 and back shell 144. The rails 159 may include an opening 181 positioned laterally to enable engagement by connecting members 169 of second segment 120. The rails may be T-shaped to enable connecting members 169 to engage rails 159, while allotting for an exterior shell of second segment 120.

FIG. 16 is a cross-sectional view taken along lines C-C of FIG. 14, illustrating connecting members 169 of second segment 120 configured for engaging rails 159 of first segment 110. The connecting members 159 extend inward from a shell 129 of housing 164 on second segment 120. The connecting members 169 are shaped for rails 159 of first segment 110. To this end, connecting members 169 may include a bulbous end 167, or other configuration to enable a non-detachable and slideable connection with first segment 11.

E. Hardware Diagram

FIG. 17 is a block diagram for a handheld computer 200 formed from moveably coupled segments, under an embodiment of the invention. One of the segments 110, 120 in handheld computer 100 carries a majority of the components for performing the core functions of the handheld computer. In an embodiment, first segment 110 carrying the display assembly 125 for handheld computer 100 is assumed to have the majority of components.

In an embodiment, handheld computer includes a processor 240 coupled to a first memory 244 (non-volatile) and a second memory 246 (volatile). The processor 240 is coupled to a display driver 222. The processor 240 combines with display driver 222 to process and signal data for presentation on a display assembly 220. The display assembly 520 includes screen and digitizer.

An analog-digital (AD) converter 232 is coupled to processor 240. One or more channels from A/D converter 232 maybe used to convert analog input provided by the digitizer, or by another analog input mechanism.

The handheld computer 100 may include one or more expansion ports for coupling to accessory devices, such as cradles, modems, memory units, re-chargers and other devices. Examples of expansion ports include serial ports, Universal serial Bus (USB) ports, CompactFlash slots and infra-red ports. In an embodiment shown, a first expansion port 202 enables one or more types of expansion modules to be connected to processor 240. The handheld computer 100 may also include a second expansion port 204 to couple to another accessory device. Each port 202, 204 is shown to be coupled to processor 240, although the components that receive a signal from one of the expansion ports 202, 204 are determined by the type of accessory device selected.

The accessory device that may be coupled to expansion port 202 may be identified by primary functions of their internal components. Each accessory device may include one or more of the following set of components: a radio-frequency transmitter and/or receiver 252, a processor 254, an input mechanism 256, additional memory 258, a battery 260, or another A/D converter 262. The same components may be used with expansion modules to second expansion port 204.

F. Alternative Embodiments

Embodiments described herein have provided for first segment 110 to include a display assembly, and second segment 120 to include input mechanisms. The relationship between the second segment 120 and first segment 110 has included configurations where second segment 120 has been positioned to overlay first segment 110. Other embodiments, however, may provide for the relationship between first segment 110 and second segment 120 to be reversed. For example, first segment 110 may be moved so that a display surface over lays the buttons. The second segment 120 may provide for the display assembly while first segment 110 provides for input mechanisms. Other examples and configurations are also contemplated by embodiments of the invention.

While embodiments described above provide for housing segments to reduce a length of handheld computer 100, other embodiments may provide for a similar configuration to be used for a width of handheld computer 100, where lateral sides 105, 105 can be moved closer to or further away from each other by first segment 110 and second segment 120.

Embodiments described above provide certain configurations for rails and connecting members. While embodiments described provide for first segment 110 to include rails, and second segment 120 to be configured to engage the rails, other embodiments may reverse the relationship. The second segment 120 may include rails that are engaged by connecting members, ridges or other structures of first segment 110.

G. Interactive Display

A handheld computer as described above may further include a sensing device that produces a signal that is dependent upon the relative position of the first segment and the second segment. This signal may be used by the handheld computer to configure the visual output of the display.

FIG. 18 shows a handheld computer 1800 similar to that shown in FIG. 1. The processor module 1801 is similar to first segment 110 of FIG. 1, and keypad slider 1802 is similar to the second segment 120 of FIG. 1. The keypad slider 1802 is an example of a sliding display cover having a key pad 1803 for user input. The processor module includes a display 1804. The display 1804 is a preferably a touch panel display; however, it may be a conventional display such as a liquid crystal display (LCD) or it may be a touch panel display capable of accepting input from user.

The processor module 1801 and keypad slider 1802 include a sensing device to produce a signal containing information regarding the relative position of the processor module 1801 and the keypad slider 1802. The sensing device may be a contact sensor such as a variable resistance potentiometer, or it may be a non-contact sensing device using an optical or magnetic transducer to detect the relative position.

The signal coupling between the keypad slider 1802 and the processor module 1801 may be achieved by sliding contacts, a flexible ribbon connector. Alternatively, the keypad slider 1802 and the processor module 1801 may be optically coupled (e.g., a light emitting diode and detector pair).

For handheld computers having a touch panel display, the sensing device may be provided by the touch panel display 1804 and a physical feature incorporated in the keypad slider 1802. The physical feature may simply be the edge of the keypad slider, or it may be one or more protrusions or sensing features on or near the edge of the keypad slider 1802 that is adjacent to the display 1804. When the display 1804 is a near field imaging (NFI) or capacitive display, sensing can be done with very light contact and essentially zero displacement at the display surface. For protrusions that establish contact with the display surface, the preferable location is at the edges of the display. For touch panel displays that require a degree of displacement at the input surface, a roller may be used to provide a contact with minimal wear and friction.

When the touch panel display 1804 is used as the sensing device, the information concerning the geometric relationship between the sensing features, the edge of the keypad slider 1802 and the touch panel display coordinates is available to the processor. Likewise, the signal from any other type of sensing device would be correlated with the relative position of the keypad slider 1802 with respect to the processor module 1801.

In an embodiment of the invention, the processor of the handheld device 1800 uses the available position information to arrange displayed visual objects so that they are viewable in response to the relative position of the processor module 1801 with respect to the keypad slider 1802. A visual object 1805 is shown on the lower portion of the display 1804 of FIG. 18. The handheld computer 1800 is in a fully extended configuration and the edge of the keypad slider 1802 is aligned with the edge of the visual object 1805.

In FIG. 19, the handheld device of FIG. 18 is shown in a partially closed position. The location of the visual object 1805 has been changed in order to maintain visibility. The visual object 1805 may be made up of one or more icons associated with the touch panel display 1804, that serve to label areas of the touch screen that are associated with actions performed by the processor module 1801.

Alternatively, the visual object 1805 may be a collection of icons associated with keys on the adjacent keypad slider 1802. The sensing device signal may be used to maintain proximity between icons displayed on the display 1804 and the edge of the keypad slider 1802.

In response to the shrinking of the visible area of the display 1804, the processor may scale the size of the overall display image, or maintain the size of the image and scroll it, or both.

In another embodiment of the invention, the information from the sensing device is used to reference a collection of symbols presented on a display of a handheld computer. FIG. 20 shows a handheld computer 2000 having a processor module 2001, a keypad slider 2002, a select button 2003, and a display 2004.

The display 2004 shows a macro command list 2005. A macro command is a string of one or symbols arranged in a line approximately parallel to the edge of the keypad slider 2002. For example, a macro command may be an ASCII character string that refers to an executable command or series of commands. For example, the character string may be an email address or telephone number that may be selected for sending an email or initiating a telephone call. Once selected, the macro command may be executed by appropriate input such as pressing the select button 2003.

FIG. 21 shows the handheld computer of FIG. 20 with the macro command "macro command 1" 2100 selected. A desired macro command is selected by adjusting the position of the keypad slider 2002 with respect to the processor module 2001 so that the edge of the keypad slider 2002 underlines the desired macro command. Once selected, a macro command may be executed by pressing the select button 2003. The set of instructions used by the processor to select a macro command is referred to as a line selection driver.

The assignment of an instruction or series of instructions to a character string has a particular advantage over assignment to a key or combination of keys. A character string may serve as an effective mnemonic device. For example, associating a telephone number or email address with a person's name as a macro command is more natural than associating the person's telephone number or email address with a number.

FIG. 22 shows a handheld computer integrated with a wireless telephone. A processor module 2201 having a wireless transceiver is slideably coupled to a keypad slider 2202. The processor module 2201 has an integrated speaker (earpiece) 2205, and the keypad slider 2202 includes an integrated microphone 2204. The coupling of the processor module 2201 and keypad slider 2202 may include a detent mechanism to provide for repeatable and stable sliding configuration of the keypad slider 2202 and the processor module 2201.

Alternatively, the microphone 2204 shown on the front side of the keypad slider 2202 may be located on the back of the keypad slider 2202, and the speaker 2205 of the processor module 2201 may be located on the back side of the processor module 2201.

Dialing of the telephone may be accomplished by using the keypad 2203, or using the previously described macro command selection technique. In the fully compact configuration shown in FIG. 21, a portion of the display remains visible, enabling dialing and wireless reception of text messages while maintaining the most compact configuration. Further details regarding the types of functionality and construction that may be embodied in the integrated device are disclosed in the U.S. patent application of Nguyen and Lam, titled "Integrated Handheld Data Processing Device Having a Sliding Form Factor", filed Nov. 30, 2001, which is wholly incorporated by reference herein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. An electronic device comprising:
   a processor;
   a display;
   a sliding component moveably coupled to said processor, wherein said sliding component is operable to slide relative to said display, and wherein said sliding component is further operable to accept at least one button input from a user; and
   a sensing device coupled to said processor and to said sliding component for detecting a relative position of said sliding component with respect to said display;
   wherein said processor is operable to perform an operation that is associated with rendered information that is identified by said relative position of said sliding component with respect to said display, and wherein said operation is responsive to said button input being pressed.

2. The electronic device of claim 1, wherein said operation is a visual configuration of data rendered on said display.

3. The electronic device of claim 1, further comprising a wireless transmitter, and wherein said operation is an initiation of communication with another device using said wireless transmitter.

4. The electronic device of claim 1, further comprising a wireless transmitter, and wherein said operation is an initiation of communication with an external device, using said wireless transmitter.

5. The electronic device of claim 1, wherein said sensing device is a non-contact sensor device.

6. The electronic device of claim 1, wherein said display is a touch panel display forming a part of said sensing device.

7. The electronic device of claim 1, wherein said rendered information that is identified by said relative position of said sliding component with respect to said display is selected responsive to signal is initiated from said sliding component by a user pressing on an input key residing on said sliding component.

8. The electronic device of claim 1, wherein said at least one button input comprises a mechanical element.

9. A method of selecting an option in an electronic device comprising a processor and a sliding component, said method comprising:
   a) displaying a plurality of elements on a display screen of said processor;
   b) detecting a position of said sliding component adjacent to a first element of said plurality of elements said display screen, wherein said sliding component relative to said display screen is operable to identify said first element for selection;
   c) detecting a user selecting said first element, wherein said selection is made by using at least one button input residing on said sliding component when said sliding component is adjacent to said first element; and d) invoking an operation of said electronic device related to said first element.

10. The method as described in claim 9 further comprising generating a position signal corresponding to a position of said sliding component relative to said display screen.

11. The method as described in claim 9 wherein aid operation is an execution of an application program.

12. The method as described in claim 9 wherein said operation is a display of related additional information to said first element.

13. The method as described in claim 9 wherein said selection is via a key.

14. The method as described in claim 9 wherein said sliding cover comprises a keyboard.

15. The method as described in claim 9 wherein said sliding cover further comprises a microphone.

16. The method as described in claim 9 wherein said sliding cover further comprises a speaker.

17. A computer readable medium containing executable instructions stored thereon for causing an electronic device to execute a method for configuring a visual output of a display, said method comprising:

displaying a plurality of objects on said display;

sensing a relative position, of a sliding component with respect to said display, and wherein said relative position is a partially closed position, and wherein said sliding component is operable to change the size of a dimension of said electronic device by sliding relative to said display; and in response to said sensing said relative position, generating said visual output on said display, wherein said visual output comprises said plurality of visual objects that are arranged and repositioned to be viewable in response to said relative position.

18. The computer readable medium of claim 17, further comprising instructions for initiating an application by a processor.

19. The computer readable medium of claim 17, further comprising instructions for initiating communication with an external device.

20. The computer readable medium of claim 17, further comprising instructions for altering said visual output in response to a signal.

21. The computer readable medium of claim 20, wherein said instructions are for a rearrangement of a previously displayed visual object.

22. An electronic device comprising:

a display operable to render a plurality of graphical elements;

a sliding component operable to move with respect to said display to detect a viewable portion and a non-viewable portion of said display, wherein a position of said sliding component is operable to control rendering of said plurality of graphical elements within said viewable portion of said display, and wherein said position of said sliding component is further operable to identify a first graphical element from said plurality of graphical elements when said sliding component is adjacent to said first graphical element, and wherein said first graphical element is selected responsive to a selection by a user via an input key on said sliding component; and a processor operable to reposition said plurality of graphical elements responsive to said position of said sliding component with respect to said display, and wherein said processor is further operable to perform an operation associated with said first graphical element in response to said selection.

23. The electronic device as described in claim 22 further comprising:

a sensor for detecting said position of said sliding component with respect to said display.

24. The electronic device as described in claim 22, wherein said first graphical element is a command to be performed by said processor.

25. The electronic device as described in claim 22, wherein said sliding component is operable to accept a user input to effect said selection.

26. The electronic device as described in claim 22 wherein said plurality of graphical elements are repositioned by said processor to increase viewability of said plurality of graphical objects within said viewable portion of said display.

* * * * *